United States Patent [19]

Esaki et al.

[11] Patent Number: 5,153,877
[45] Date of Patent: Oct. 6, 1992

[54] PACKET NETWORK WITH COMMUNICATION RESOURCE ALLOCATION AND CALL SET UP CONTROL OF HIGHER QUALITY OF SERVICE

[75] Inventors: Hiroshi Esaki, Yokohama; Yasuhiro Katsube, Kawasaki; Kazuaki Iwamura, Yokohama, all of Japan

[73] Assignee: Kabushiki Kaisha Toshiba, Kawasaki, Japan

[21] Appl. No.: 511,424

[22] Filed: Apr. 19, 1990

[30] Foreign Application Priority Data

Apr. 21, 1989 [JP] Japan .................... 1-103099
Aug. 25, 1989 [JP] Japan .................... 1-217560
Jan. 19, 1990 [JP] Japan .................... 2-10402

[51] Int. Cl.$^5$ .............................. H04J 3/24
[52] U.S. Cl. ........................ 370/94.1; 370/60; 370/85.6
[58] Field of Search ............ 370/60, 60.1, 94.1, 370/94.2, 95.1, 85.6

[56] References Cited

U.S. PATENT DOCUMENTS

| | | | |
|---|---|---|---|
| 3,728,681 | 4/1973 | Fuller | 370/85.6 |
| 4,651,318 | 3/1987 | Luderer | 370/60 |
| 4,654,845 | 3/1987 | Mukerji | 370/85.6 |
| 4,748,658 | 5/1988 | Gopal et al. | 379/221 |
| 4,864,560 | 9/1989 | Quinquis | 370/85.6 |
| 4,868,813 | 9/1989 | Suzuki | 370/60 |
| 4,872,159 | 10/1989 | Hemmady et al. | 370/94.1 |
| 4,893,304 | 1/1990 | Giacopelli et al. | 370/60 |
| 4,947,387 | 8/1990 | Knorpp et al. | 370/60 |
| 4,964,119 | 10/1990 | Endo et al. | 370/94.1 |
| 5,043,981 | 8/1991 | Firooymand | 370/85.6 |

FOREIGN PATENT DOCUMENTS

| | | |
|---|---|---|
| 0212031 | 3/1987 | European Pat. Off. |
| 0275678 | 7/1988 | European Pat. Off. |
| 63-250945 | 10/1988 | Japan |
| 63-258135 | 10/1988 | Japan |
| WO86/06569 | 11/1986 | World Int. Prop. O. |
| WO89/09522 | 10/1989 | World Int. Prop. O. |

Primary Examiner—Douglas W. Olms
Assistant Examiner—T. Samuel
Attorney, Agent, or Firm—Foley & Lardner

[57] ABSTRACT

A packet network in which the qualities of service can be maintained for different communications of different classes of requirement for quality of service, regardless of types of calls and data. In this packet network, a communication resource is subdivided into sub-resources which are to be allocated to communications classified into communication classes, where an amount of communications within each sub-resource is controlled independently to satisfy a required quality of service. Also, first type of calls for which a ratio of a maxium transfer speed of each call with respect to a transfer speed of multiplexed line of the packet network is greater than a predetermined threshold value, and second type of calls which are not the first type of calls are distinguished, and a priority control to favor the first type of calls over the second type of calls is performed.

10 Claims, 23 Drawing Sheets

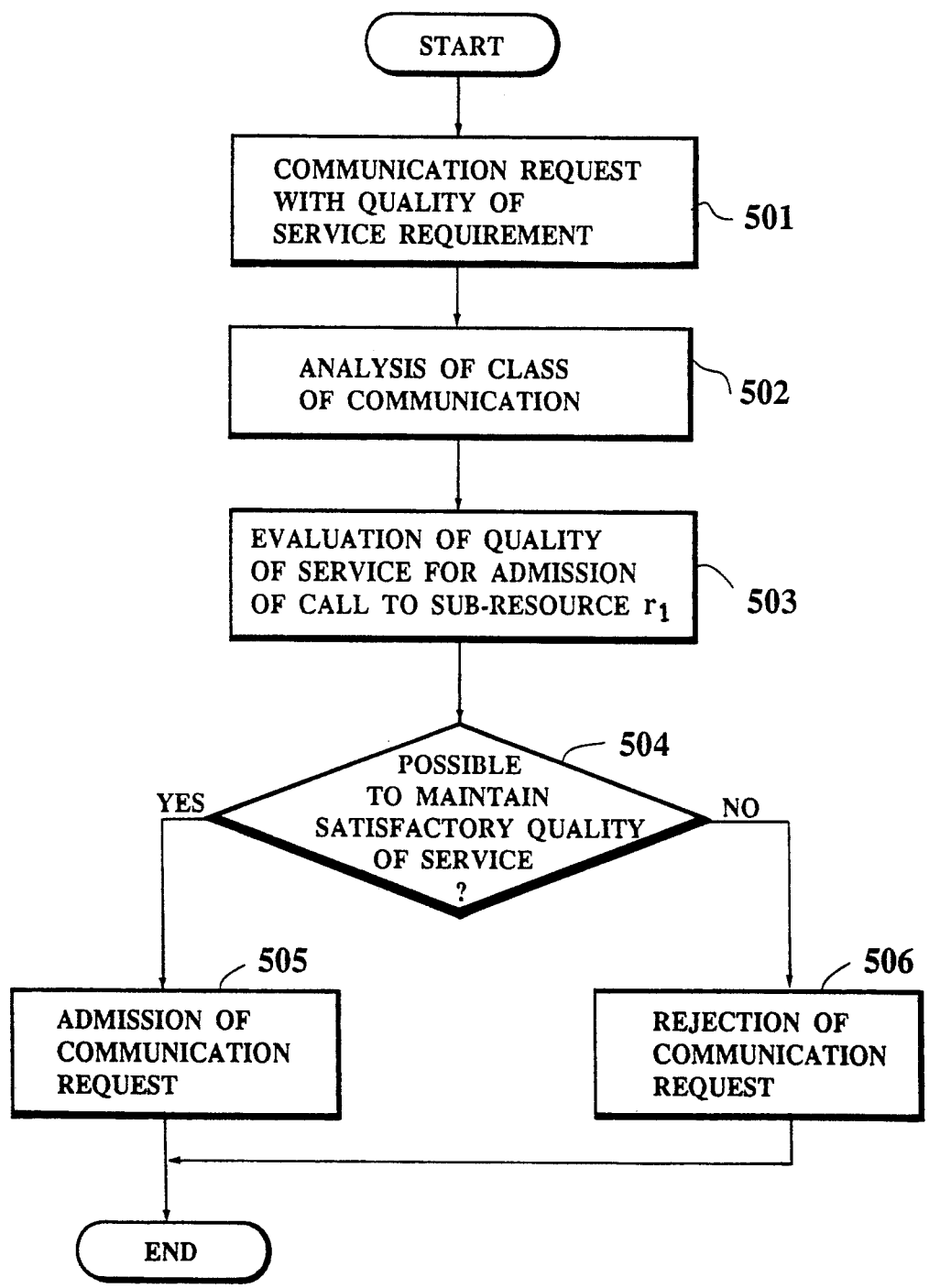

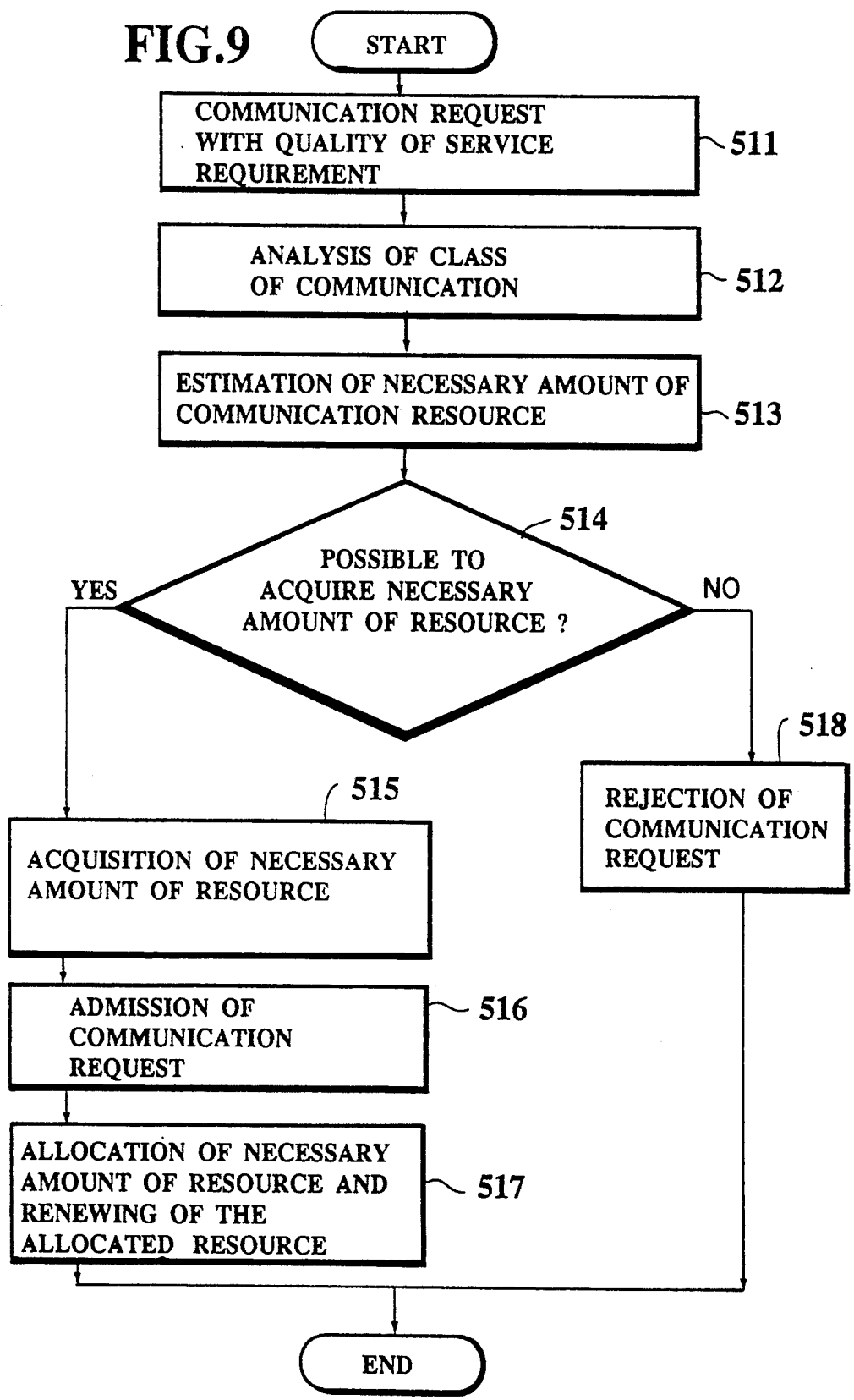

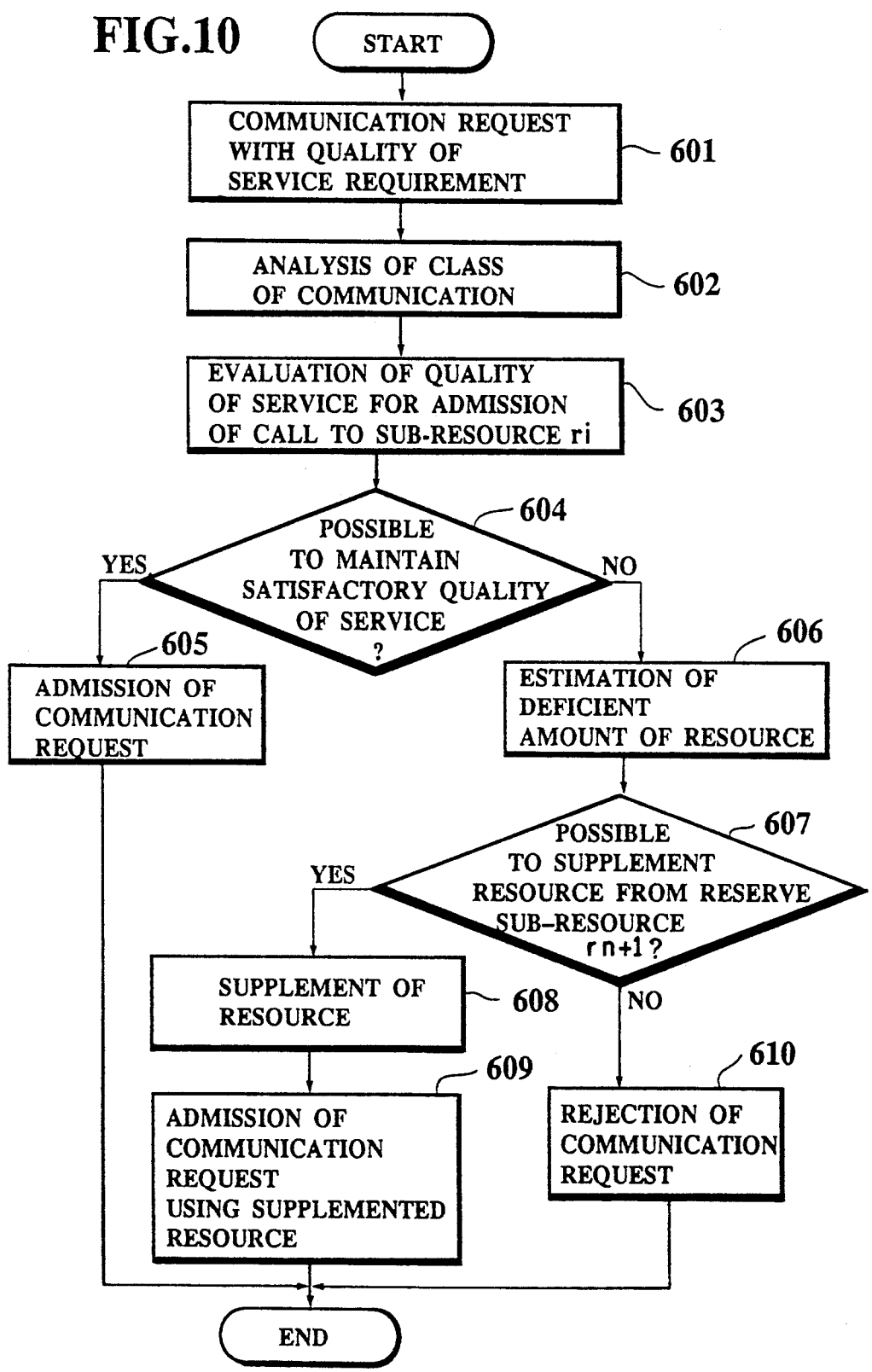

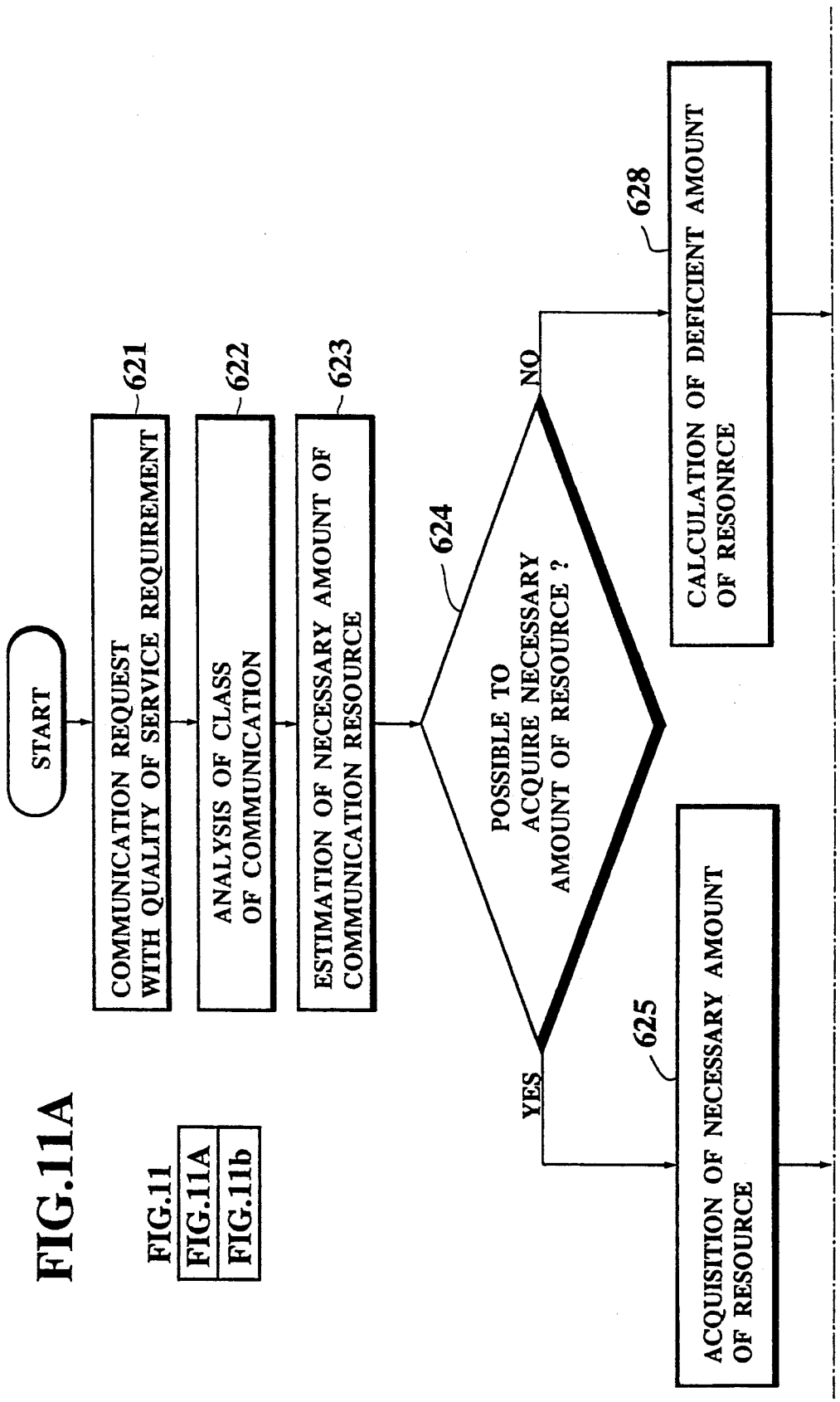

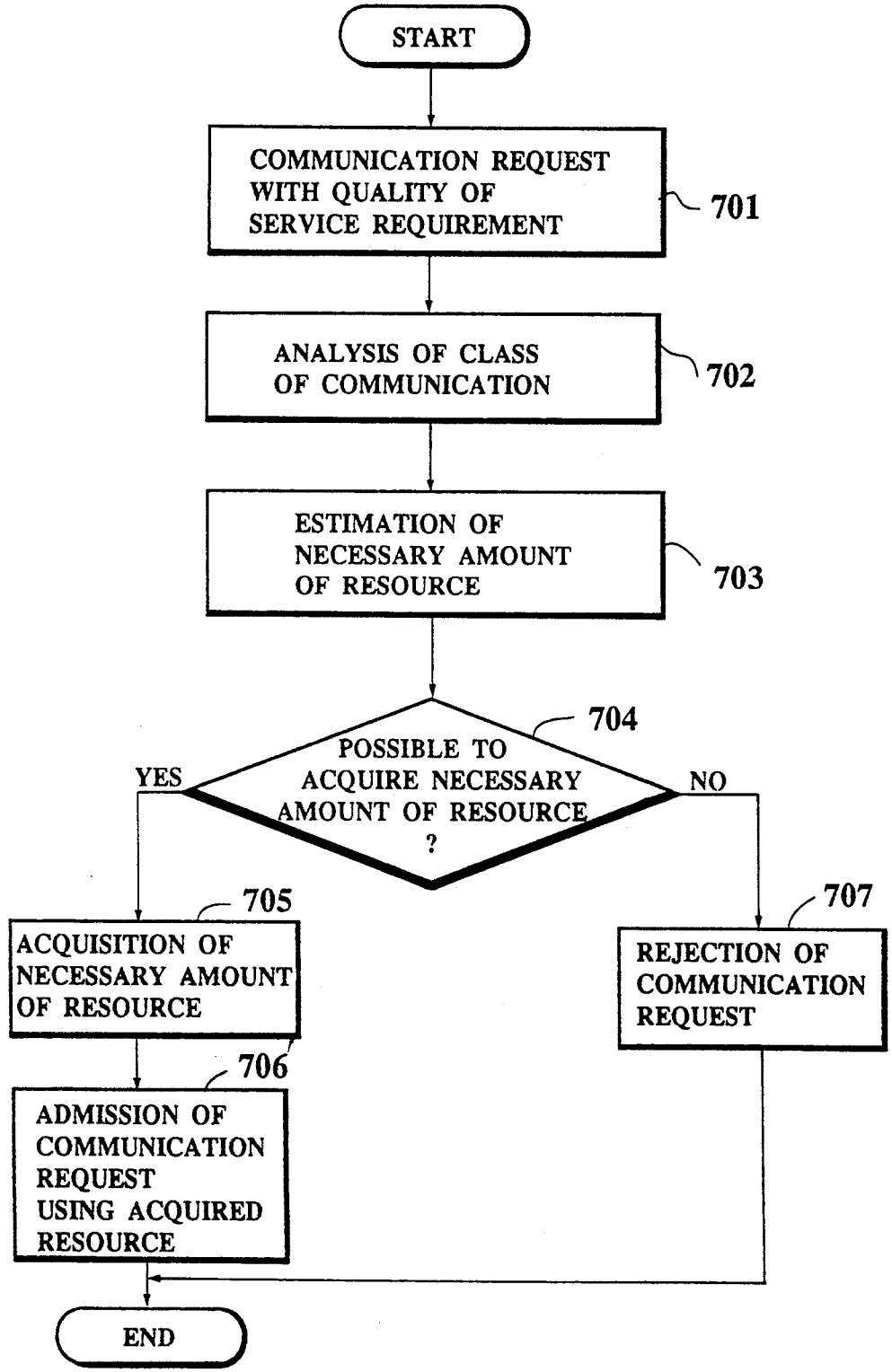

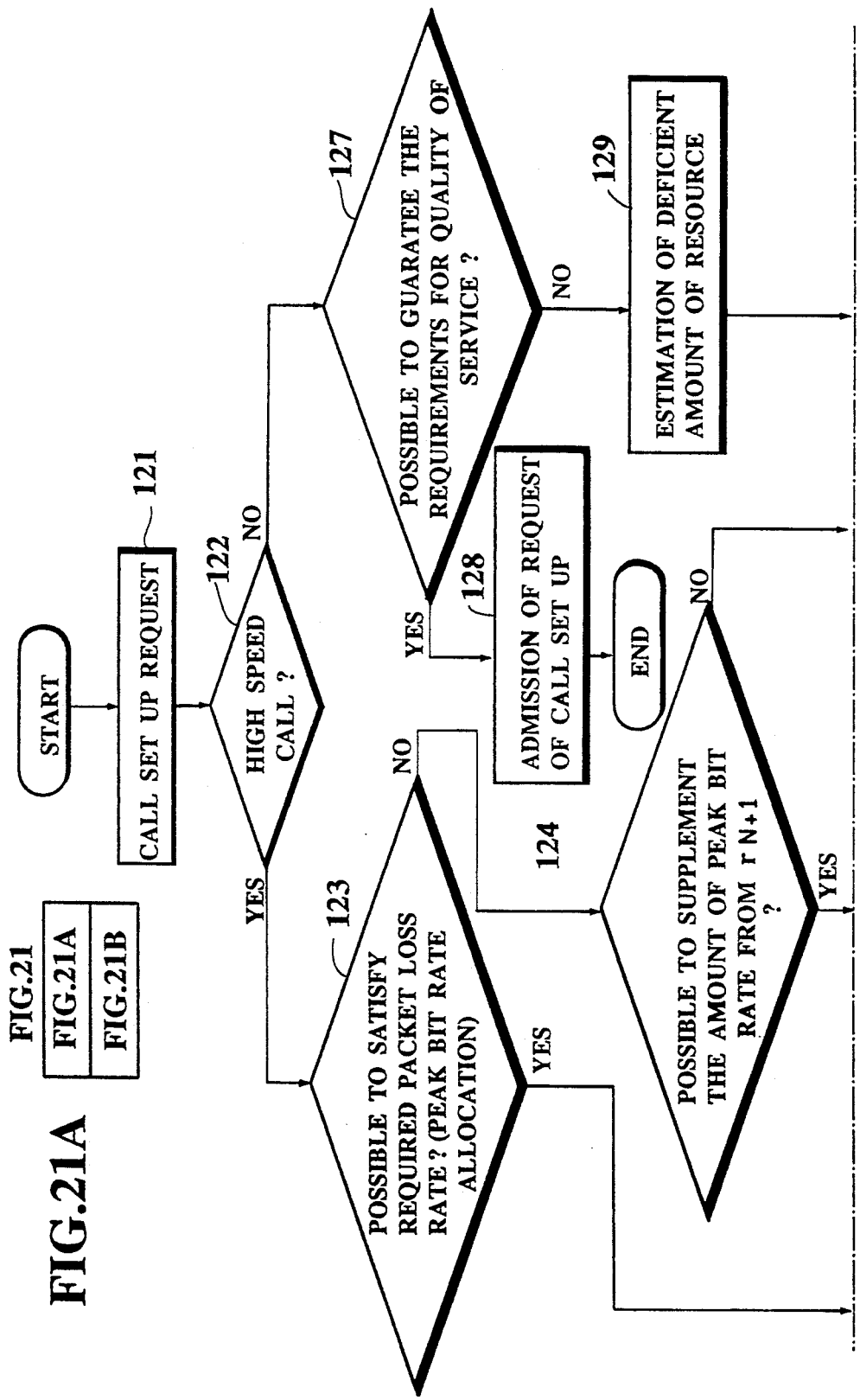

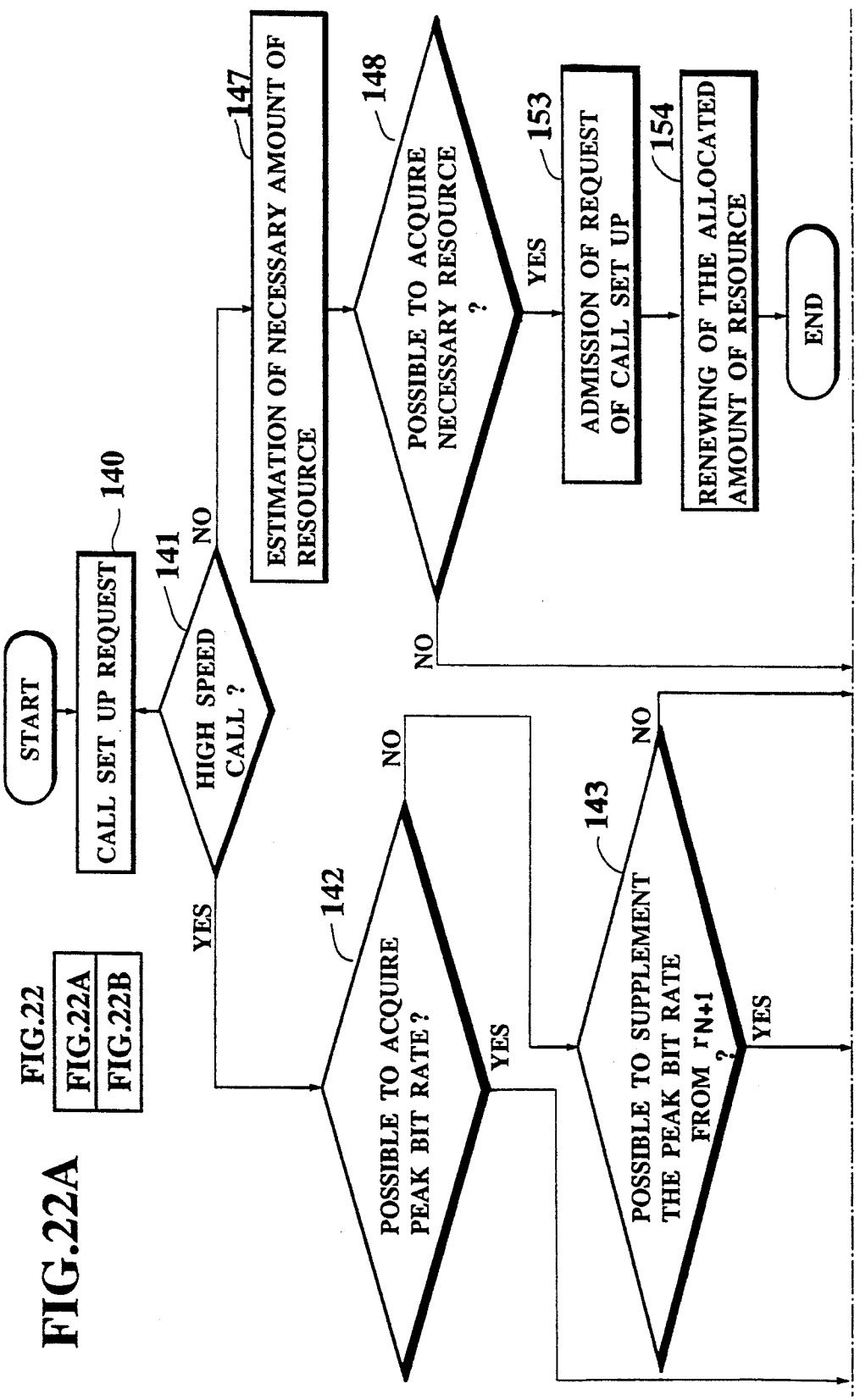

PACKET NETWORK WITH COMMUNICATION RESOURCE ALLOCATION AND CALL SET UP CONTROL OF HIGHER QUALITY OF SERVICE

BACKGROUND OF THE INVENTION

1. Field of the Invention

The present invention relates to a packet network for communicating information in forms of packets in ATM (asynchronous transfer mode) in which each packet has a fixed packet length.

2. Description of the Background Art

In a conventional packet network, a communication resource of the network has been shared on an equal basis by all of the terminals of the network, so as to facilitate an efficient utilization of the communication resource by means of an effect of statistical multiplexing due to a sharing of a single communication resource among a plurality of communications.

Namely, as shown in FIG. 1, a communication resource provided by a packet exchanger 1 of a packet network is shared by classes of communications classified into a class 1 to a class N. In this case, as shown in FIG. 2, each one of individual sub-resource $r_i$ (i=1, 2,—) of the communication resource is shared by more than one classes of communications.

However, this manner of allocation of the communication resource causes a problem that qualities of service such as a packet loss rate (or a cell loss rate) and a transmission delay are uniformly deteriorated for all the classes of communications, when more than a manegeable number of packets are entered. This is a direct consequence of sharing of the communication resource among a plurality of communications on an equal basis.

On the other hand, there has been a system of packet network in which a priority level is assigned to each class of communication in accordance with a requirement for a packet loss rate, so as to facilitate a so called priority control such that a certain degree of packet loss rate can be maintained.

However, since the communication resource has been shared among communications of different priority levels, the actual packet loss rate depends on a relative amount of packets for these communications of different priority levels, so that it has been difficult to control the packet loss rate accurately.

In addition, a lack of consideration for a communication speed of each communication has been making it difficult to maintain the packet loss rate below a certain level.

As for a call set up control to be performed when a single communication resource is shared among a plurality of communications, there has been a system of packet network which achieves the call set up control as follows. Namely, as shown in FIG. 3, each one of terminals 3 sends a call set up request individually to a multiplexer 4 of the packet network which is equipped with a multiplexed line 5, and the multiplexer 4 determines whether to set up the calls requested by judging whether it is possible to guarantee the satisfactory qualities of service to all the calls requested. Here, the qualities of service to be considered are a packet loss rate and a transmission delay. Thus, each time a call set up request is received from one of the terminals 3, the multiplexer 4 makes an assessment for the packet loss rate and the transmission delay from a known communication characteristics of each of the terminals 3, and judges whether it is possible to guarantee the satisfactory qualities of service to all the calls requesting to be set up in the packet network 3. The requesting call is set up only when this criterion is satisfied. This manner of call set up control aims to achieve a more efficient utilization of the communication resource without sacrificing the qualities of service excessively.

However, conventionally, since the packet loss rate required by the calls or estimated by the multiplexer 4 is in general an average packet loss rate evaluated for a extended period of time, so that the expected level of the packet loss rate may not be obtainable temporarily, even when the call set up control as described above is adopted.

For this reason, the conventional packet network completely ignored the temporal packet loss rate or sequential loss properties such as continuous packet losses. Therefore, when the calls possess burst property in which the packets are not necessarily discarded at random, rather continuous discarding of packets takes place, and even when the call set up control is performed to maintain the packet loss rate at certain level over an extended period of time, the temporal packet loss rate, especially that due to a continuous discarding of the packets, cannot be controlled at the satisfactory level. In particular, in a case of multiplexed calls occurring in a multiplexed line configuration of FIG. 3, a number of packets to be continuously discarded becomes overwhelmingly greater for high speed calls than for low speed calls, because for the high speed calls, as many packets as being transferred during a bursty period will be discarded continuously.

Furthermore, in a packet network, a state of traffic varies with time. For this reason, in order to maintain a certain quality of service for each call, it is necessary to judge whether to set up a call or not in accordance with an estimate for the quality of service for a case of setting up a new call, estimated on a basis of a current state of traffic and an available communication resource.

An example of a conventional method to achieve this is that in which the packet loss rate is evaluated by using a burst overflow rate. In this method, it is assumed that when a sum of the maximum speeds to send out the packets exceeds the capacity of the multiplexed line, such exceeding ones are discarded, and the packet loss rate is estimated from a probability for occurrence of such a discarding which is derived from a ratio of the maximum transfer speed and an average transfer speed of each call. Now, this method of estimating the packet loss rate using the burst overflow rate is known to require an enormous amount of calculation in a case in which the packet network is to deal with numerous types of calls. This amount of calculation in fact becomes so much for a practical situation that this method itself becomes rather impractical to implement.

SUMMARY OF THE INVENTION

It is therefore an object of the present invention to provide a packet network in which the qualities of service can be maintained for different communications of different classes of requirement for quality of service.

It is another object of the present invention to provide a packet network in which the qualities of service can be maintained regardless of types of calls and data.

It is another object of the present invention to provide a packet network in which the packet loss rate can be estimated with a reduced amount of calculation.

According to one aspect of the present invention there is provided a method of communication resource allocation in a packet network, comprising the steps of: subdividing a communication resource of the packet network into a plurality of sub-resources in correspondence with communications classified into a plurality of communication classes; allocating one of the sub-resources to each one of the communication classes; and controlling an amount of communications within each sub-resource independently, such that a quality of service required by the communications to which each sub-resource is allocated can be satisfied within each sub-resource.

According to another aspect of the present invention there is provided a method of call set up control in a packet network, comprising the steps of: distinguishing first type of calls for which a ratio of a maximum transfer speed of each call with respect to a transfer speed of multiplexed line of the packet network is greater than a predetermined threshold value, and second type of calls which are not the first type of calls; and performing a priority control to favor the first type of calls over the second type of calls such that all packets of the first type of calls are transferred before any packet of the second type of calls.

According to another aspect of the present invention there is provided a call set up control device in a packet network, comprising: means for distinguishing first type of calls for which a ratio of a maximum transfer speed of each call with respect to a transfer speed of multiplexed line of the packet network is greater than a predetermined threshold value, and second type of calls which are not the first type of calls; and means for performing a priority control to favor the first type of calls over the second type of calls such that all packets of the first type of calls are transferred before any packet of the second type of calls.

Other features and advantages of the present invention will become apparent from the following description taken in conjunction with the accompanying drawings.

BRIEF DESCRIPTION OF THE DRAWINGS

FIG. 8 is a flow chart for one possible operations of the packet network of FIG. 4.

FIG. 9 is a flow chart for another possible operation of the packet network of FIG. 4.

FIG. 10 is a flow chart for another possible operation of the network of FIG. 4.

FIG. 11A and 11B are a flow chart for another possible operation of the packet network of FIG. 4.

FIG. 12 is a flow chart for another possible operation of the packet network of FIG. 4.

FIGS. 21A and 21B are a flow chart for another possible operation of the call set up control with priority control, to be performed in the packet network of FIG. 4.

FIGS. 22A and 22B are a flow chart for another possible operation of the call set up control with priority control, to be performed in the packet network of FIG. 4.

DETAILED DESCRIPTION OF THE PREFERRED EMBODIMENTS

Figure 1:
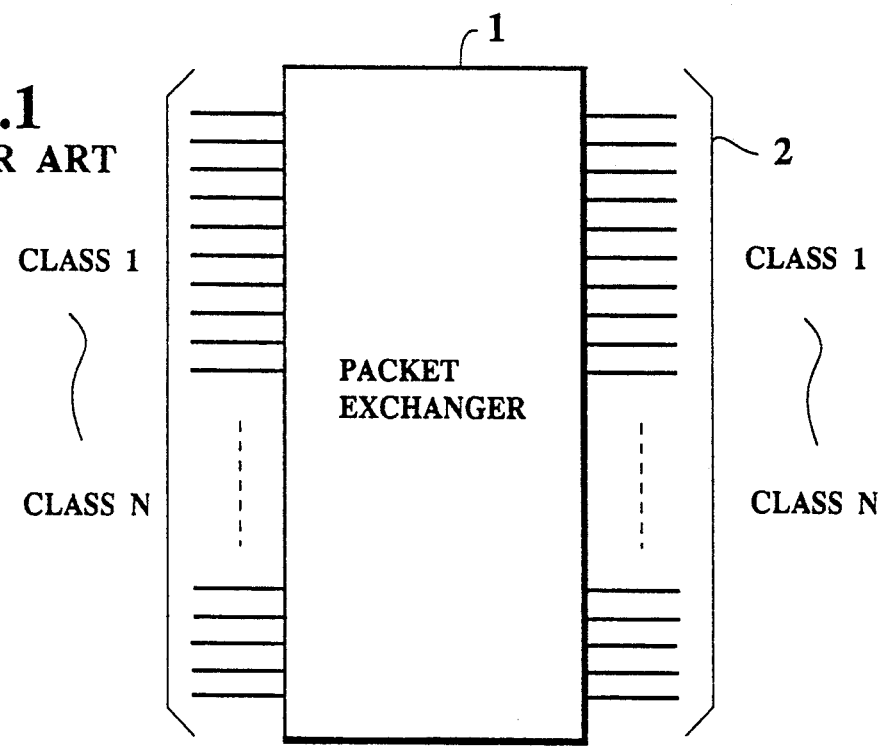
FIG. 1 is a schematic diagram of one example of a conventional packet network.
Figure 2:
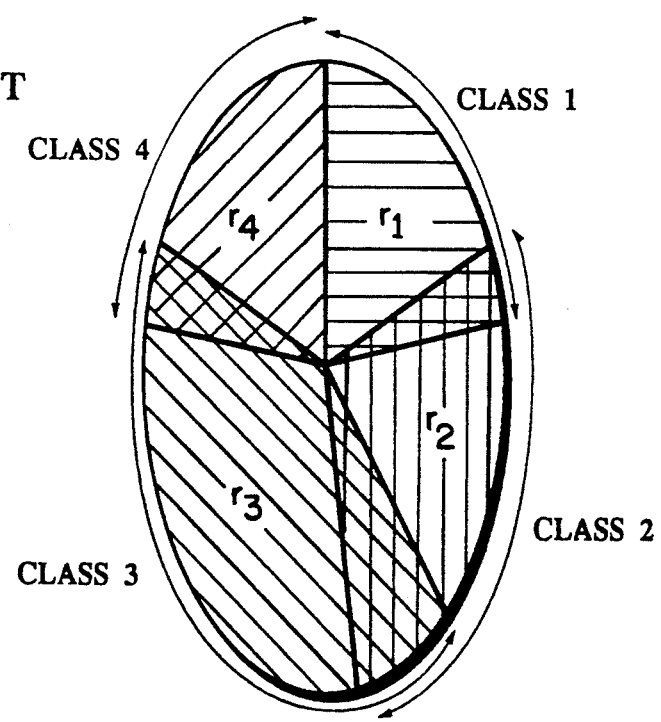
FIG. 2 is a diagram for explaining a sharing of a communication resource by a plurality of classes of communications in the packet network of FIG. 1.
Figure 3:
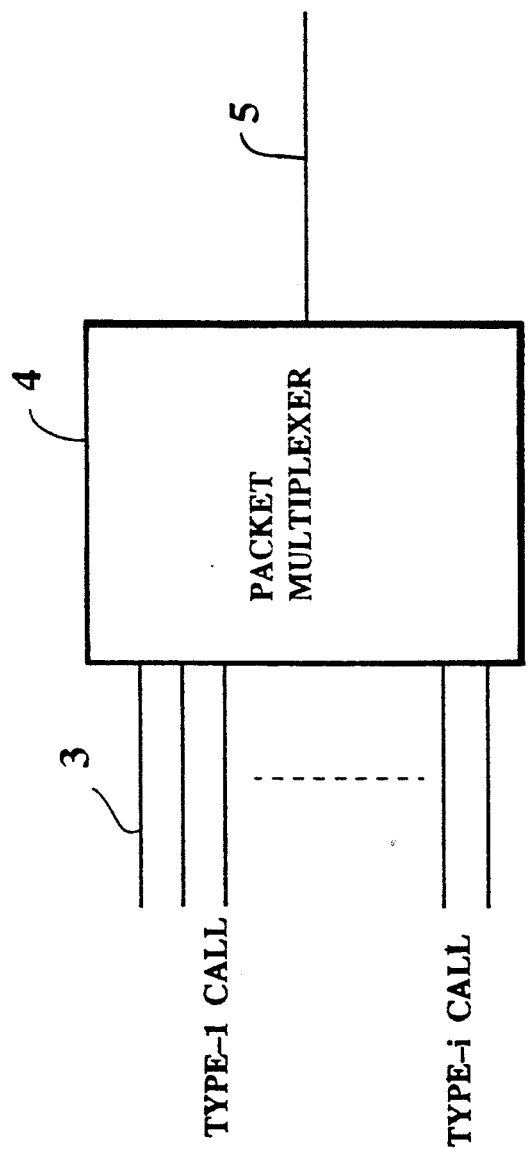
FIG. 3 is a schematic diagram of another example of a conventional packet network including a multiplexed line.
Figure 4:
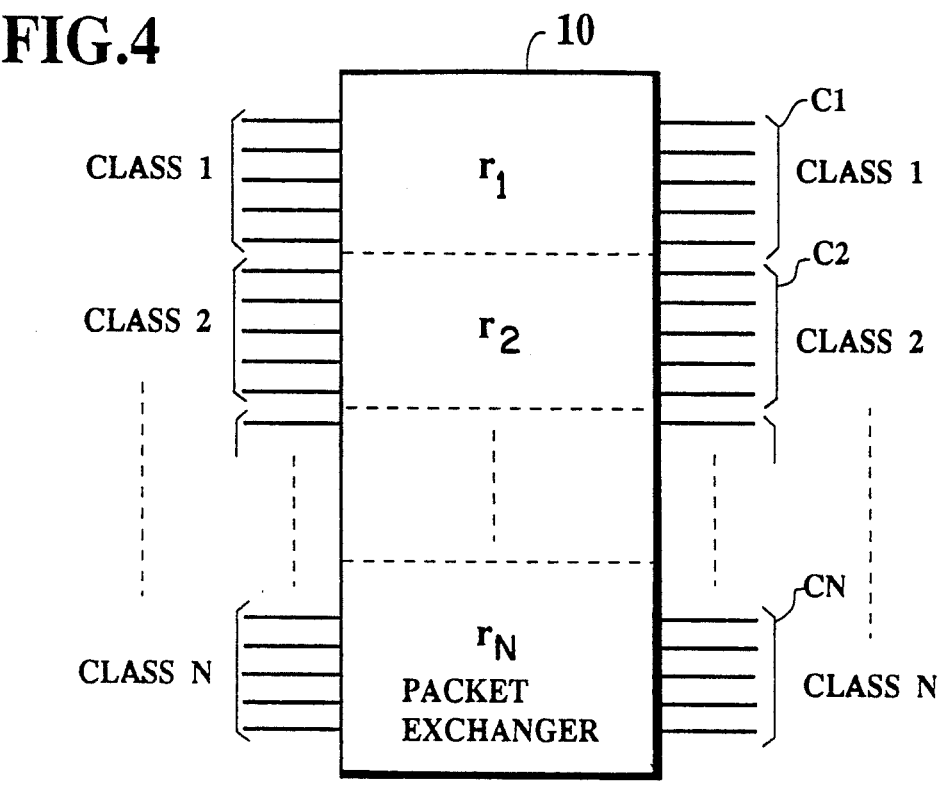
FIG. 4 is a schematic diagram of one embodiment of a packet network according to the present invention.

Referring now to FIG. 4, there is shown one embodiment of a packet exchanger for a packet network according to the present invention.

In this embodiment, a communication resource such as a bandwidth or a buffer capacity of the packet exchanger 10 is divided up into a plurality (N in number) of mutually independent sub-resources $r_i$ (i=1, 2,—, N) in correspondence with a plurality (N in number) of classes of communications C1 (class 1) to CN (class N), where an amount of calls accommodated by each sub-resource $r_i$ is controlled, so as to maintain a certain quality of service at satisfactory level.

Figure 5:
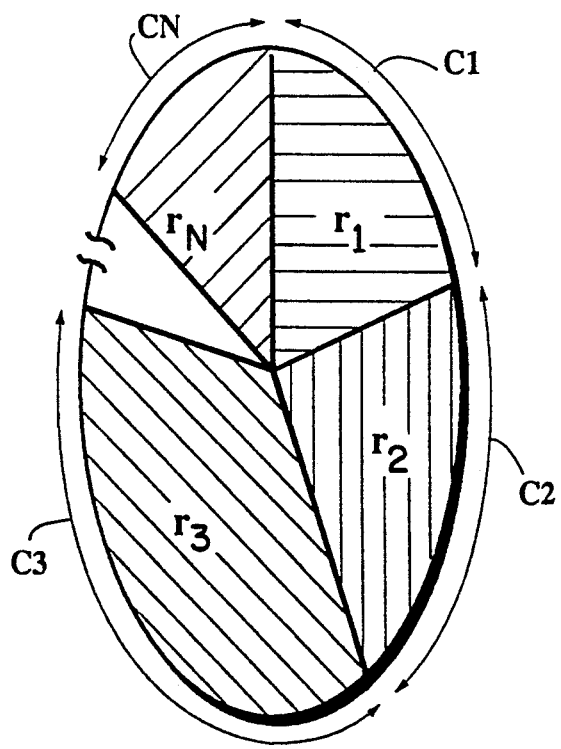
FIG. 5 is a diagram for explaining a sharing of a communication resource by a plurality of classes of communications in the packet network of FIG. 4.

Accordingly, as shown in FIG. 5, each sub-resource $r_i$ is exclusively allocated to one class of communication, and the call set up control is performed with respect to each sub-resource $r_i$ independently, so that the quality of service can be maintained at a desired level within each sub-resource $r_i$.

As a consequence, the quality of service obtainable within each sub-resource can easily be evaluated by classifying the communications according to the value of the packet loss rate required by each call, allocating different sub-resources for communications of different packet loss rates, and performing the call set up control with respect to each sub-resource separately.

Also, even when more than manageable number of packets are accommodated by one particular sub-resource $r_i$, the satisfactory quality of service can still be maintained at the other sub-resources.

Figure 6:
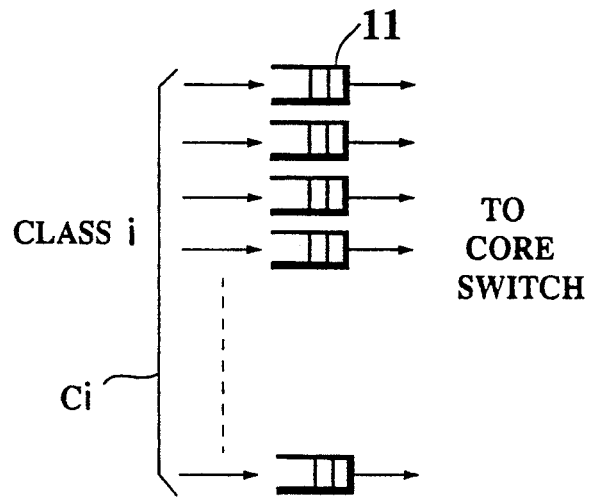
FIG. 6 is a buffer configuration for the packet network of FIG. 4 without the priority control.

In a case of not performing the priority control within each class Ci, the packet exchanger 10 operates, as shown in FIG. 6, such that each communications of each class Ci is connected through a buffer 11 to each one of independent core switches (not shown) separately, so as to control each communication completely independently from other communications.

Figure 7:
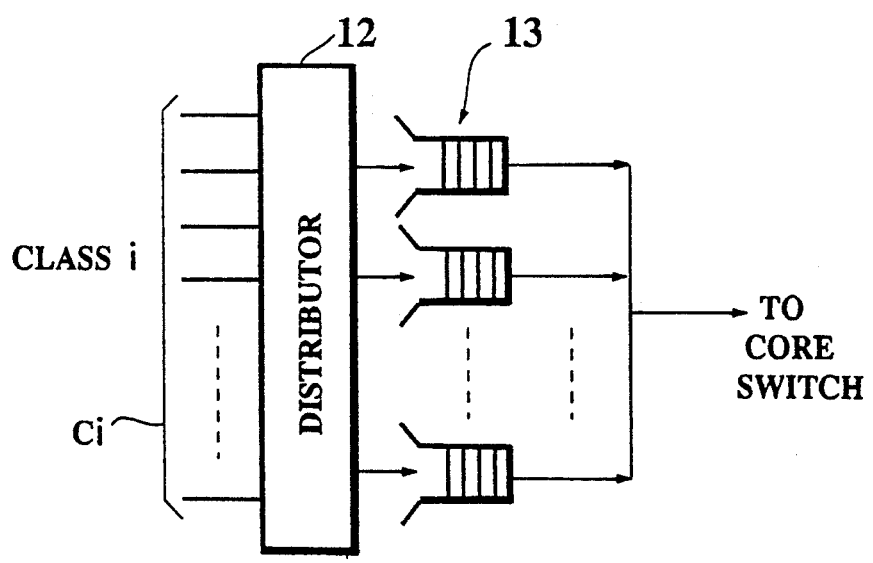
FIG. 7 is a buffer configuration for the packet network of FIG. 4 with the priority control.

On the other hand, in a case of performing the priority control within each class Ci, input buffers of the packet exchanger 10 operates, as shown in FIG. 7, such that the communications of the class Ci are connected through a distributor 12 to priority control buffers 13, before being given to a common core switch (not shown), so that the priority control can be achieved by means of the priority control buffers 13.

Furthermore, the packet exchanger 10 can be operated in various different manners, according to different manners of treating the sub-resources $r_i$ of the communication resource.

One example of sub-resource utilization is a case in which the division of the communication resource into the sub-resources $r_i$ is fixed, in which the packet exchanger 10 is operated according to a flow chart of FIG. 8 as follows.

Namely, in this case, the communication resource such as a bandwidth, buffer capacity or both is divided up into N distinct sub-resources $r_i$, either physically or logically, in correspondence with N different classes Ci, where each sub-resource $r_i$ is allocated to each Ci without overlaps. Here, a size of each sub-resource $r_i$ is predetermined according to the number of calls to be granted an admission to each sub-resource $r_i$ or expected to be granted an admission to each sub-resource $r_i$.

Now, in response to a communication request of call set up accompanied by a quality of service requirement generated at the step 501, the packet exchanger 10 analyzes the class of this communication at the step 502, and evaluates the quality of service resulting from the admission for this communication request of call set up to an appropriate sub-resource $r_i$ at the step 503.

At this point, a state of the traffic for this sub-resource $r_i$ is known to the packet exchanger 10, so that at the step 504, the packet exchanger 10 can determine whether it is possible to maintain the satisfactory quality of service for all communications of this class Ci after the admission of this communication request of call set up.

The communication request of call set up is granted an admission only when the packet exchanger 10 judges that it is possible to satisfy the requirement for quality of service for all communications of this class Ci after the admission of this communication request of call set up. In such a case, the communication request of call set up is granted an admission at the step 505, whereas otherwise the communication request of call set up is rejected at the step 506.

In this operation, the priority control using communication speeds as a criterion for the priority levels may be incorporated in a form of either a preemptive priority control or a nonpreemptive priority control. For example, in a case of a nonpreemptive priority control, separate buffers are provided for different communication speed classes and the packets in a buffer for high speed communication are outputted unconditionally, whereas the packets in a buffer for low speed communication are not outputted until all the packets in buffers for the high speed communications are outputted.

Alternatively, in this case in which the division of the communication resource into the sub-resource $r_i$ is fixed, the packet exchanger 10 may be operated according to a flow chart of FIG. 9 as follows.

Namely, here, the communication resource such as a bandwidth, buffer capacity or both is divided up into N distinct sub-resources $r_i$, either physically or logically, in correspondence with N different classes Ci, where each sub-resource $r_i$ is allocated to each class Ci without overlaps. Here, a size of each sub-resource $r_i$ is predetermined according to the number of calls to be granted an admission to each sub-resource $r_i$ or expected to be granted an admission to each sub-resource $r_i$.

Now, in response to a communication request of call set up accompanied by a quality of service requirement generated at the step 511, the packet exchanger 10 analyzes the class of this communication at the step 512, and evaluates the necessary amount of communication resource for this communication request of call set up at the step 513.

At this point, the amount of allocated communication resource for the already accommodated calls for this class is known to the packet exchanger 10, so that at the step 514, the packet exchanger 10 can determine whether it is possible to acquire the necessary amount of resource from the sub-resource allocated to this class.

The communication request of call set up in granted an admission only when the packet exchanger 10 judges that it is possible to acquire the necessary amount of resource. In such a case, the necessary amount of resource is acquired from the sub-resource allocated to this class at the step 515, the communication request of call set up is granted an admission at the step 516, and the amount of allocated communication resource for the already accommodated calls for this class is renewed at the step 517, whereas otherwise the communication request of call set up is rejected at the step 518.

As in the previous case, in this operation, the priority control using communication speeds as a criterion for the priority levels may be incorporated in a form of either a preemptive priority control or a nonpreemptive priority control.

Another example of sub-resource utilization is a case in which at least one of the sub-resources $r_i$ is utilized as a reserve, in which the packet exchanger 10 is operated according to a flow chart of FIG. 10 as follows.

Namely, in this case, the communication resource is divided up into N+1 distinct sub-resources $r_j$ (j=1, 2, . . . N, N+1), either physically or logically, in correspondence with N different classes Ci (i=1, 2, . . . , N), where can sub resource $r_j$ is allocated to each class Ci without overlaps, while one additional sub-resource $r_{N+1}$ is left as a reserve. Here, the reserve sub-resource $r_{N+1}$ is not used when the communications can be handled by the other N sub-resources $r_i$.

Now, in response to a communication request of call set up accompanied by a quality of service requirement generated at the step 601, the packet exchanger 10 analyzes the class of this communication at the step 602, and evaluates the quality of service resulting from the admission of this communication request of call set up to an appropriate sub-resource $r_i$ at the step 603.

At this point, a state of the traffic for this sub-resource $r_i$ is known to the packet exchanger 10, so that at the step 604, the packet exchanger 10 can determine whether it is possible to satisfy the requirement for quality of service for all communications of this class Ci after the admission of this communication request of call set up.

The communication request of call set up is granted an admission only when the packet exchanger 10 judges that it is possible to satisfy the requirement for quality of service for all communications of this class Ci after the admission of this communication request of call set up. In such a case, the communication request of call set up is granted an admission at the step 605.

On the other hand, in this case, when the packet exchanger 10 judges that it is not possible to satisfy the requirement for quality of service for all communications of this class Ci after the admission of this communication request of call set up, a deficiency in amount of resource necessary to guarantee the required quality of service is estimated at the step 606, and then whether such an amount of resource can be supplemented from the reserve sub-resource $r_{N+1}$ is determined at the step 607.

If so, the deficient resource is supplemented from the reserve sub-resource $r_{N+1}$ at the step 608, and the pending communication request of call set up is granted an admission by using this supplemented resource at the step 609. The resource supplemented from the reserve sub-resource $r_{N+1}$ will be released again as soon as the need for such a supplement vanishes.

Otherwise, the pending communication request of call set up is rejected at the step 610.

The manner of acquiring supplement resource from the reserve sub-resource $r_{N+1}$ may be either that in which each of the other N sub-resources $r_i$ attempts to acquire as much of the supplement as needed whenever the need arises, in which case even a whole of the reserve sub-resource $r_{N+1}$ may be supplemented for one sub-resource $r_i$ if necessary, or else that in which an amount of supplement acquirable by one sub-resource $r_i$ is limited by a predetermined upper bound.

As in the earlier cases, in this operation, the priority control using communication speeds as a criterion for the priority levels may be incorporated in a form of either a preemptive priority control or a nonpreemptive priority control.

Alternatively, in this case in which at least one of the sub-resources $r_i$ is utilized as a reserve, the packet exchanger 10 may be operated according to a flow chart of FIG. 11 as follows.

Namely, in this case, the communication resource is divided up into N+1 distinct sub-resources $r_j$ (j=1, 2, . . . N, N+1) either physically or logically, in correspondence with N different classes Ci (i=1, 2, . . . , N), where each sub-resource $r_i$ is allocated to each class Ci without overlaps, while one additional sub-resource $r_{N+1}$ is left as a reserve. Here, the reserve sub-resource $r_{N+1}$ is not used when the communications can be handled by the other N sub-resources $r_i$.

Now, in response to a communication request of call set up accompanied by a quality of service requirement generated at the step 621, the packet exchanger 10 analyzes the class of this communication at the step 622, and evaluates the quality of service resulting from the admission of this communication request of call set up to an appropriate sub-resource $r_i$ at the step 623.

At this point, the amount of allocated communication resource for the already accommodated calls for this class is known to the packet exchanger 10, so that at the step 624, the packet exchanger 10 can determine whether it is possible to acquire the necessary amount of resource from the sub-resource allocated to this class.

The communication request of call set up is granted an admission only when the packet exchanger 10 judges that it is possible to acquire the necessary amount of resource. In such a case, the necessary amount of resource is acquired from the sub-resource allocated to this class at the step 625, the communication request of call set up is granted an admission at the step 626, and the amount of allocated communication resource for the already accommodated calls for this class is renewed at the step 627.

On the other hand, in this case, when the packet exchanger 10 judges that it is not possible to acquire the necessary amount of resource from the sub-resource allocated to this class, a deficiency in amount of resource is estimated at the step 628, and then whether such an amount of resource can be supplemented from the reserve sub-resource $r_{N+1}$ is determined at the step 629.

If so, the deficient resource is supplemented from the reserve sub-resource $r_{N+1}$ at the step 630, the pending communication request of call set up is granted an admission at the step 631, and the necessary resource is allocated to accommodate this call while the amount of the allocated resource is renewed at the step 632. The resource supplemented from the reserve sub-resource $r_{N+1}$ will be released again as soon as the need for such a supplement vanishes.

Otherwise, the pending communication request of call set up is rejected at the step 633.

As before, the manner of acquiring supplement resource from the reserve sub-resource $r_{N+1}$ may be either that in which each of the other N sub-resources $r_i$ attempts to acquire as much of the supplement as needed whenever the need arises, in which case even a whole of the reserve sub-resource $r_{N+1}$ may be supplemented for one sub-resource $r_i$ if necessary, or else that in which an amount of supplement acquirable by one sub-resource $r_i$ is limited by a predetermined upper bound.

Also, as in the earlier cases, in this operation, the priority control using communication speeds as a criterion for the priority levels may be incorporated in a form of either a preemptive priority control or a nonpreemptive priority control.

Still another example of sub-resource utilization is a case in which the division of the communication resource into the sub-resources $r_i$ is made to be dynamically variable, in which the packet exchanger 10 is operated according to a flow chart of FIG. 12 as follows.

Namely, in this case, the communication resource is not divided up into the sub-resources $r_i$ (i=1, 2, . . . , N) in advance, but an attempt is made to allocate as much sub-resource of the communication resource as necessary to each class of communication whenever the communication request of call set up of a particular communication class is generated. When an additional new communication request call of a particular communication class is generated, an attempt is made to acquire as much additional sub-resource of the communication resource as necessary to maintain the required quality of service.

Here, however, each sub-resource is still allocated uniquely to a particular class of communication as in the earlier cases, and not shared by different classes of communications.

Now, in response to a communication request of call set up accomplished by a quality of service requirement generated at the step 701, the packet exchanger 10 analyzes the class of this communication at the step 702.

Then, at the step 703, an amount of resource necessary to guarantee the required quality of service is estimated, and then whether such an amount of resource can be acquired from still unallocated portion of the communication resource is determined at the step 704.

If so, the necessary amount of resource is acquired from the still unallocated resource at the step 705, and the pending communication request of call set up is granted an admission by using this acquired resource at the step 706.

Otherwise, the pending communication request of call set up is rejected at the step 707.

The manner of acquiring necessary amount of resource can be similar to that of acquiring supplement resource from the reserve sub-resource $r_{N+1}$ in the previous case.

Also, as in the previous cases, the priority control using communication speeds as a criterion for the priority levels may be incorporated in a form of either a preemptive priority control or a nonpreemptive priority control.

In the embodiments described above, any combination of the packet loss rate, transmission delay, and communication speed may be used as a parameter to classify the requirement for the quality of service.

For the packet loss rate, requirements such as $10^{-3}$, $10^{-6}$, and $10^{-8}$ may be employed.

For the transmission delay, requirements of magnitudes of the transmission delay, or magnitudes of delay jitter may be employed.

The communication speed may be classified either uniquely for an entire packet network by using an absolute value (bps) of the communication speed, or in terms of a ratio of the communication speed with respect to a size of the communication resource such as that of a bandwidth or a buffer capacity. More specifically a ratio of the communication speed with respect to a size of the communication resource may be a ratio of a transfer speed of a call with respect to a capacity of a multiplexed line, or a ratio of a buffer size required by a call with respect to a buffer size of a section to be multiplexed.

As for the request of the class of the quality of service, a terminal generating a call itself may request the classes of the quality of service directly, or a terminal generating a call may only specify a requirement for the communication speed or the packet loss rate (either in terms of an absolute value or a class of an absolute value) which is subsequently transformed into the requirement for the quality of service with respect to the communication resource such as a multiplexed line or buffers.

Also, in a case of utilizing the communication speed, the same requirement for the class of the quality of service concerning the packet loss rate and/or the transmission delay may be taken differently according to a size of the sub-resource to be allocated, or in other words, different sub-resources of different sizes may be allocated to the same requirement of the class of the quality of service. For example, when the communication resource is the multiplexed line which is divided into a sub-resource $r_L$ of a large capacity and a sub-resource $r_S$ of a small capacity, there can be a requirement of the quality of service which would belong to a class of low speed from a point of view of the sub-resource $r_L$ while which would belong to a class of high speed from a point of view of the sub-resource $r_S$. Also, there can be two requirements of the quality of service req1 and req2 both of which would belong to a class of low speed from a point of view of the sub-resource $r_L$ while req1 would belong to a class of high speed and req2 would belong to a class of low speed from a point of view of the sub-resource $r_S$.

Figure 11B:
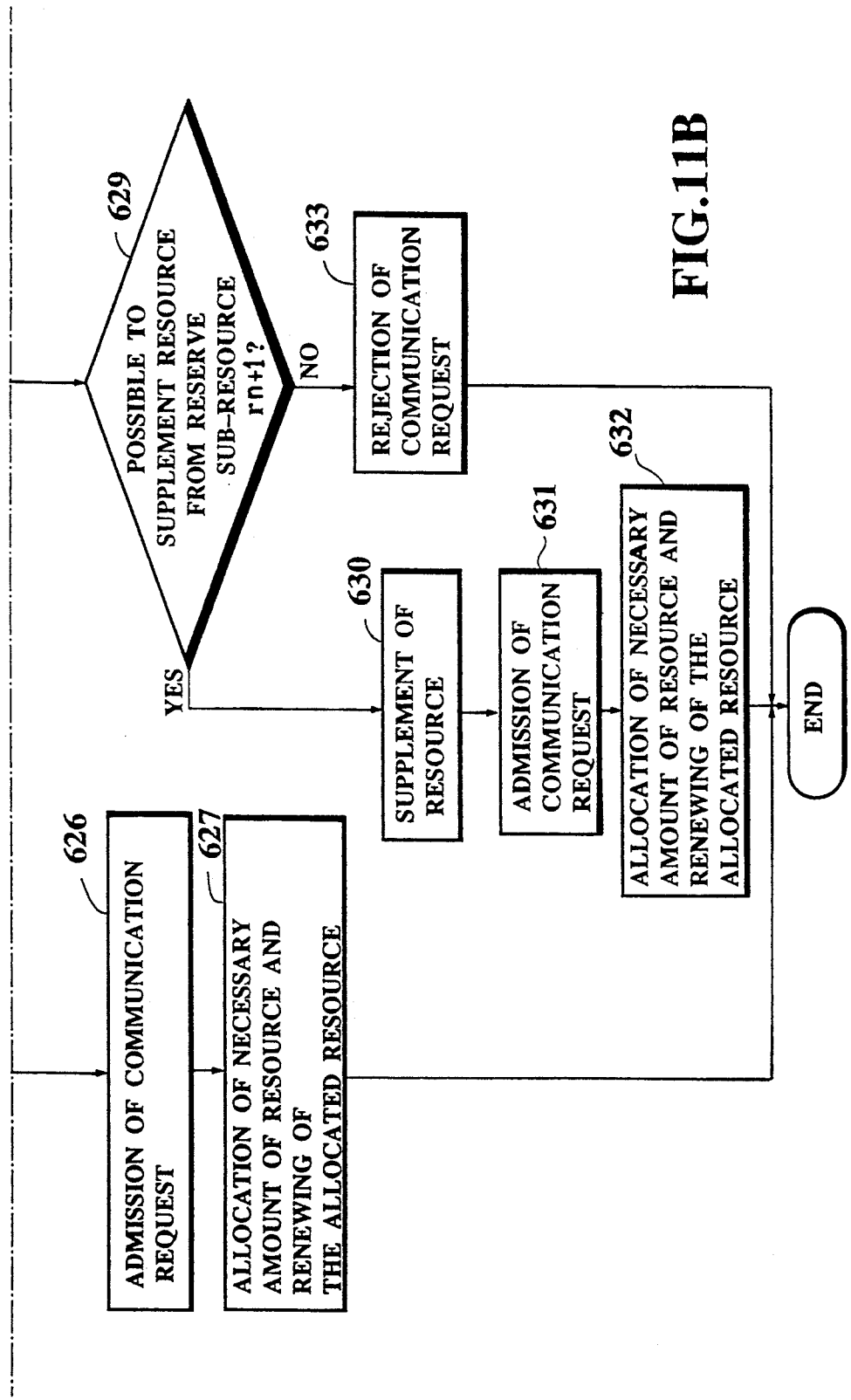

Referring now to FIG. 11, an exemplary case of using the bandwidth as the communication network will be described.

In FIG. 11, virtual path groups 801, 802, 803, 804 and 805 are forming digital links between exchangers A and C, C and B, A and B, A and D, and D and B, respectively, where the exchanger A is connected to a terminal 806, while the exchangers B, C, and D are connected to terminals 807. To the exchangers A, B, C, and D, bandwidths $L_A$, $L_B$, $L_C$, and $L_D$, respectively, are allocated, while to the virtual path groups 801, 802, 803, 804, and 805, bandwidths $L_1$, $L_2$, $L_3$, $L_4$, and $L_5$, respectively, are allocated. These bandwidths $L_A$, $L_B$, $L_C$, and $L_D$, and $L_1$, $L_2$, $L_3$, $L_4$, and $L_5$ are related by the following relationships:

$$L_A = L_1 + L_3 + L_4$$

$$L_B = L_2 + L_3 + L_5$$

$$L_C = L_1 + L_2$$

$$L_D = L_4 + L_5$$

In these virtual path groups 801, 802, 803, 804, and 805, the communication resource of bandwidths can be managed according to the present invention as follows.

Namely, as shown in FIG. 12, each one of the virtual path groups 801, 802, 803, 804, and 805 comprises three distinct virtual paths 811, 812, and 813 dividing the bandwidth allocated to each virtual path group in three without an overlap, which are provided in correspondence with three classes of the quality of service. When a call with a particular requirement of the class of the quality of service is generated, whether one of the virtual paths 811, 812, and 813 corresponding to this requirement can grant an admission to the call is determined.

Figure 13:
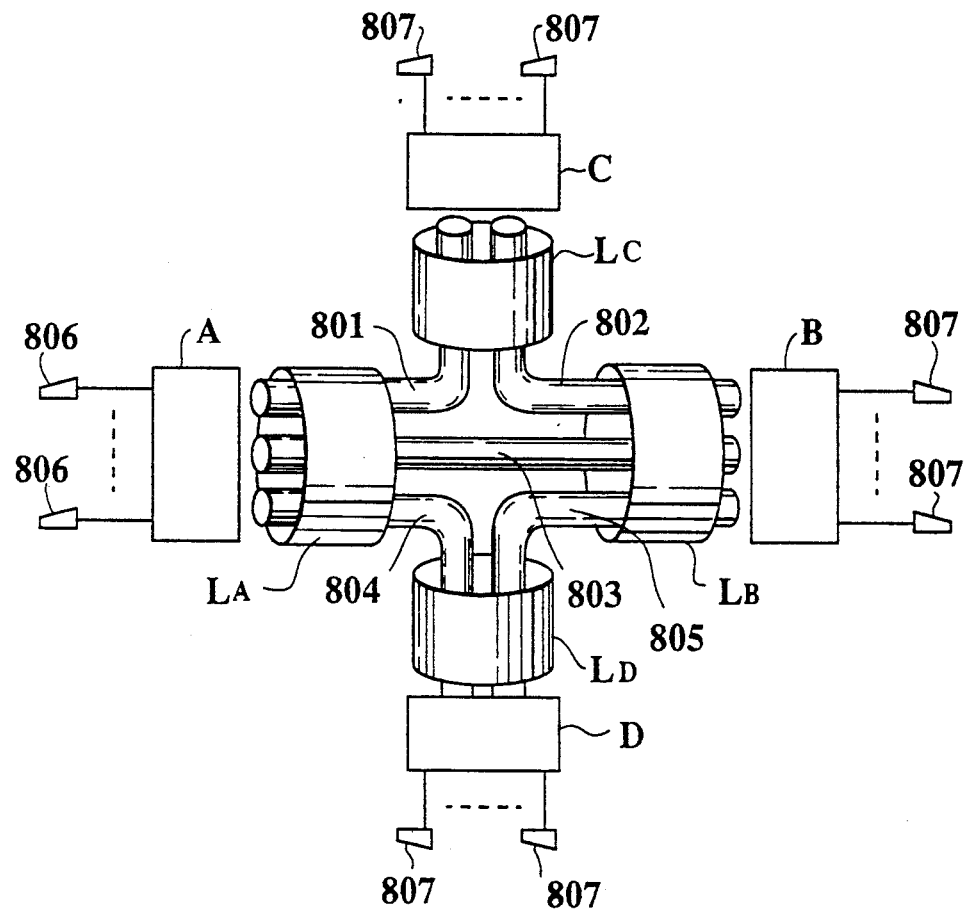
FIG. 13 is a schematic block diagram for an exemplary configuration for the packet network of FIG. 4 using virtual paths.

Similarly, as shown in FIG. 13, the communication network of bandwidths can be managed according to the present invention in ordinary digital links between the exchangers.

In FIG. 13, each digital link between exchangers E and F; F and G; and F and H is provided by triple channels 821, 822, and 823; 824, 825, and 826; and 827, 828, and 829, respectively. Here, the exchanger E is connected to the terminal 806, the exchanger F is used as transit node, and the exchangers G and H are connected to the terminals 807. The bandwidths are allocated to the digital links between the exchangers, such that a bandwidth $L_{EF}$ is allocated to a digital link of triple channels 821, 822, and 823; a bandwidth $L_{FG}$ is allocated to a digital link of triple channels 824, 825, and 826; and a bandwidth $L_{FH}$ is allocated to a digital link of triple channels 827, 828, and 829. The triple channels 821, 822, and 823; 824, 825, and 826; and 827, 828, and 829 divide the bandwidth of the digital link in three without an overlap, and are provided in correspondence with three classes of the quality of service. When a call with a particular requirement of the class of the quality of service is generated, whether one of these triple channels corresponding to this requirement can grant an admission to the call is determined.

Moreover, the examples of FIG. 12 and FIG. 13 described above can be mixed, as shown in FIG. 14.

Figure 14:
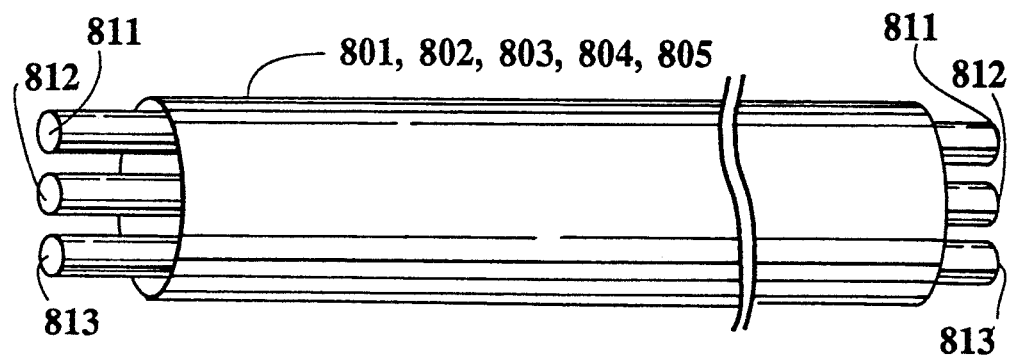
FIG. 14 is a detail view of a virtual path in the configuration of FIG. 11.
Figure 15:
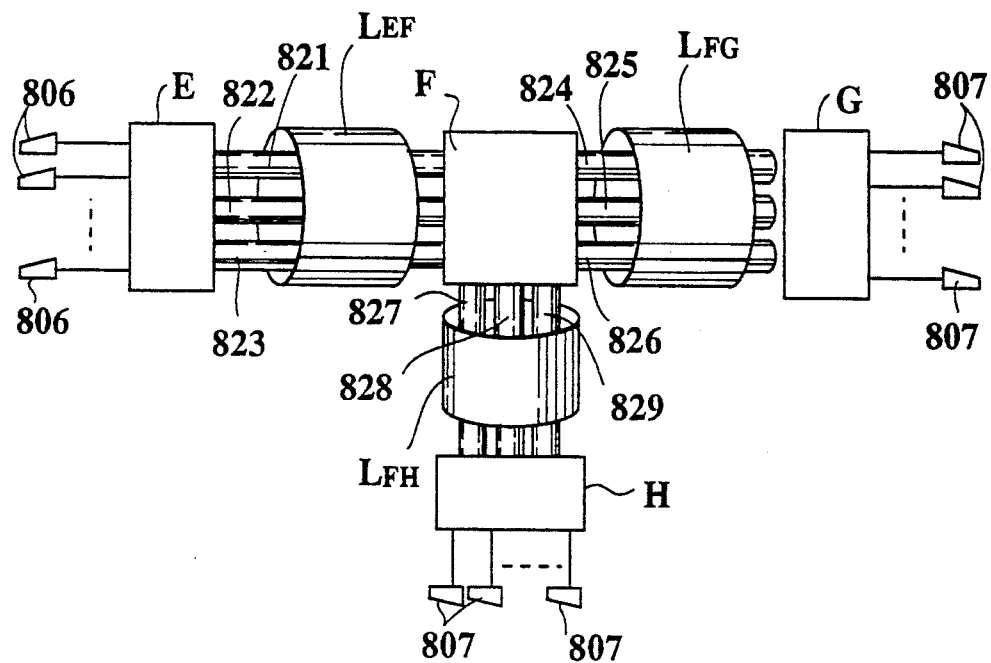
FIG. 15 is a schematic block diagram for an exemplary configuration for the packet network of FIG. 4 using ordinary digital links.
Figure 16:
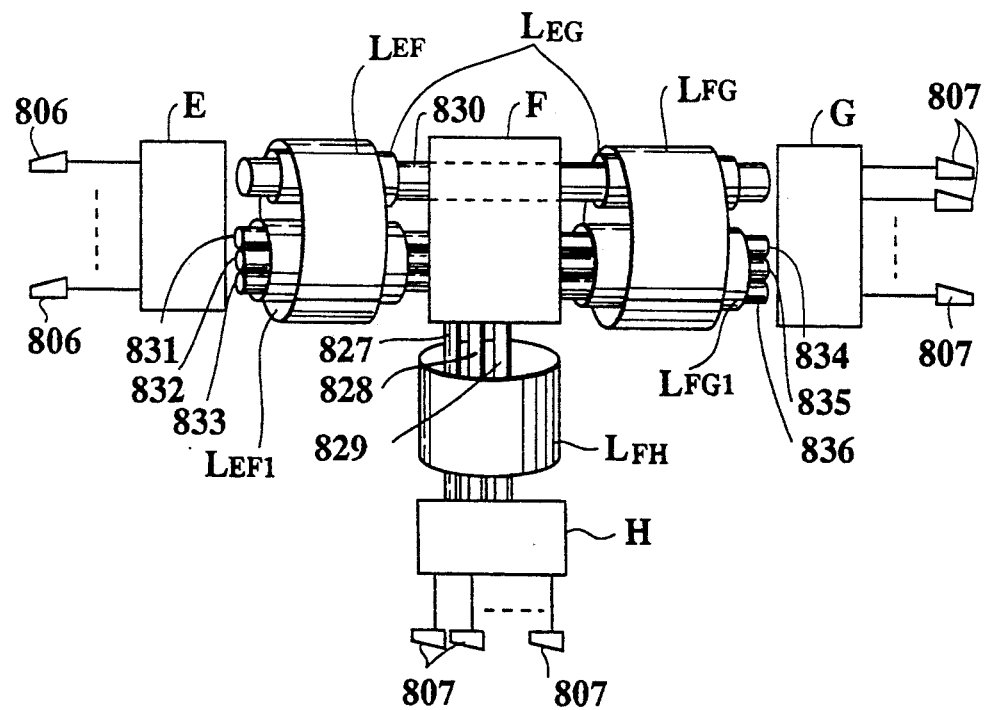
FIG. 16 is a schematic block diagram for an exemplary configuration for the packet network of FIG. 4 using a virtual path and ordinary digital links.

In FIG. 14, the bandwidths $L_{EF}$ and $L_{FG}$ are further divided into $L_{EG}$ and $L_{EF1}$, and $L_{EG}$ and $L_{FG1}$, respectively. The bandwidth $L_{EG}$ is allocated to a virtual path group 830 connecting the exchangers E and G directly, while the bandwidths $F_{EF1}$ and $L_{FG1}$ are covered by digital links of triple channels 831, 832, and 833; and 834, 835, and 836, respectively. The bandwidth is managed with respect to the virtual path 830 as in an example of FIG. 12 described above, while the bandwidths are managed with respect to the digital links of triple channels 831, 832, and 833; 834, 835, and 835; and 827, 828, and 829, as in an example of FIG. 13 described above.

Now, the call set up control without the priority control utilizing the communication speeds according to the present invention will be described in detail.

Here, the packet loss rate can be estimated by several methods, the details of which will now be described.

First of all, there is a method utilizing the probability density function, in which the call set up control for the is performed by using the probability density function which has a number of packets generated by each call as a variable. Namely, the traffic characteristic of each call is expressed in terms of the probability density function having a number of packets generated within a predetermined period of time as a variable, the multiplexed traffic characteristic is obtained by taking convolution of the probability density function of each call, and the packet loss rate is estimated on a basis of this multiplexed traffic characteristic. This method has been described by the present inventors in Japanese Patent Application No. 1-23071(1989).

Secondly, a method in which the packet loss rate is estimated on a basis of the peak bit rate and the average bit rate is also known.

In contrast, there is a method utilizing the bandwidth allocation at the peak bit rate alone, in which the call set up control is performed by utilizing the bandwidth allocation at the peak bit rate.

Figure 17:
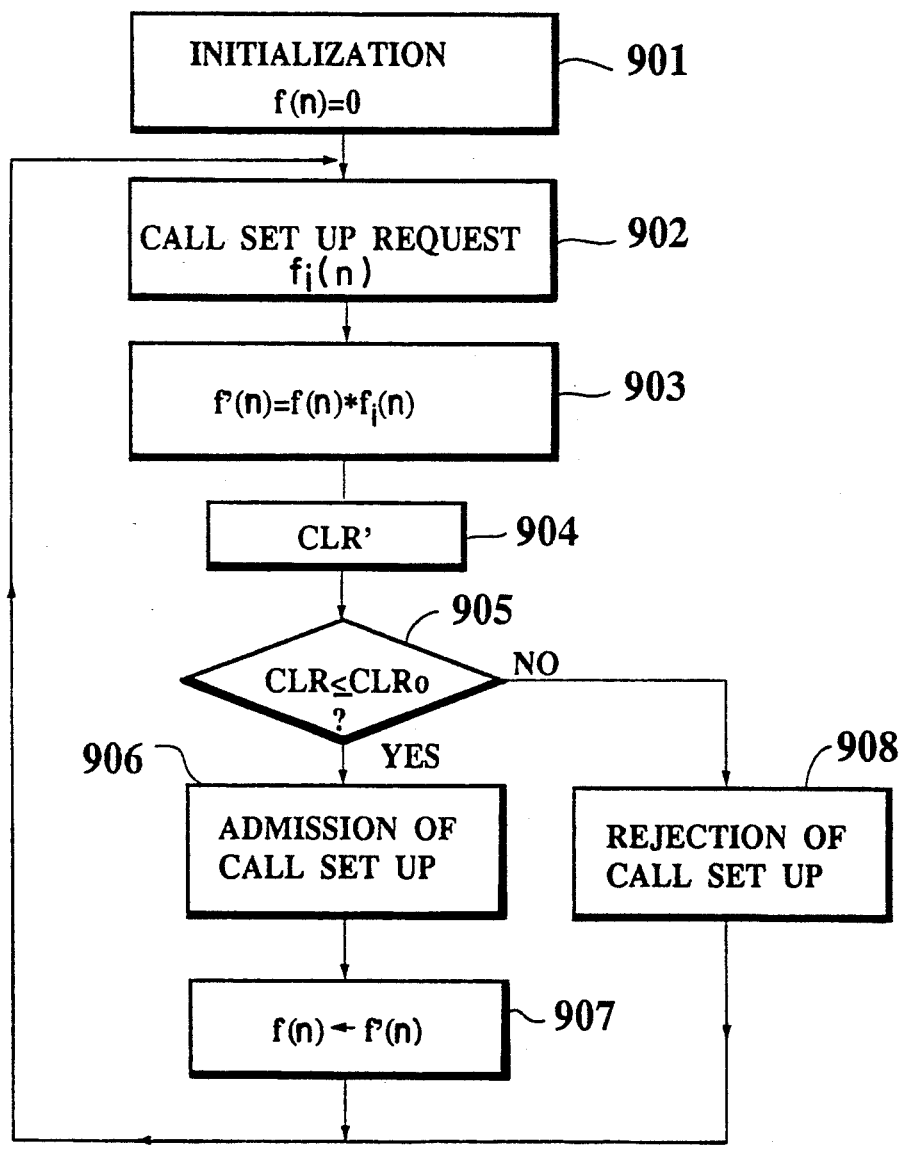
FIG. 17 is a flow chart for the call set up control without priority control, to be performed in the packet network of FIG. 4.

Referring now to FIG. 17, a detail of the method utilizing the probability density function will be described. This method is carried out according to the flow chart of FIG. 17, as follows.

Here, all the packets to be entered are assumed to be of a fixed length, and each packet is assumed to take a unit time for being transferred to the multiplexed line.

Also, in this method, the packet network is to be notified of the maximum transfer speed $M_i$ of the packets of the call from an i-th terminal at the time of call set up request.

In this method, the packet network is to be notified of a probability density function $f_i(n)$ for transferring n packets in a prescribed time T by the i-th terminal. The value of the probability density function $f_i(n)$ may be provided to the packet network directly, or it may be estimated by the packet network on a basis of various parameters specifying the traffic characteristic such as the peak bit rate and the average bit rate. In a case of estimating th probability density function $f_i(n)$ from the peak bit rate $V_{mi}$ and the average bit rate $V_{ai}$ of the i-th call, it is sufficient to consider the worst situation in which the packet loss rate becomes greatest. Thus, the probability density function $f_i(n)$ in this case is estimated as follows.

$$f_i(n) = \begin{cases} 1 - (V_{ai}/V_{mi}) & \text{for } n = 0 \\ V_{ai}/V_{mi} & \text{for } n = V_{mi}T \\ 0 & \text{otherwise} \end{cases}$$

Now, initially, when there is no terminal connected to the packet network, a probability density function f(n) for transferring n packets in a prescribed time T by the entire calls is set to an initial value "0" at the step 901.

Then, when the call set up request is made from the i-th terminal at the step 902, the probability density function f'(n) for transferring n packets in the prescribed time T by the entire calls of those which have already been set up and the requested one is obtained, as the convolution $f(n)*f_i(n)$ of the probability density function f(n) and the probability density function $f_i(n)$ at the step 903, and then the packet loss rate CLR' for the entire calls of those which have already been set up and the requested one is estimated on a basis of the probability density function f'(n) at the step 904.

Then, this estimated packet loss rate CLR' is compared with the packet loss rate $CLR_0$ required by the entire calls of those which have already been set up and the requested one at the step 905.

If the packet loss rate CLR' is less than the packet loss rate $CLR_0$, this call set up request is granted an admission at the step 906, and in such a case the probability density function f(n) is updated by the probability density function f'(n) at the step 907.

Otherwise, this call set up request is rejected at the step 908.

Then the process returns to the step 902, so that the same procedure will be carried out with respect to the next call set up request.

Next, a detail of the method utilizing the peak bit rate and the average bit rate will be described.

In this method utilizing the peak bit rate and the average bit rate, the traffic characteristic of each call is expressed in terms of the maximum transfer speed of the call and the average transfer speed of the call, the packet loss rate is estimated from these maximum transfer speed and the average transfer speed under the assumption that those packets arriving in excess of a predetermined number of packets transferrable within a prescribed period of time will be discarded, and the call set up control is carried out by comparing the packet loss rate so estimated with the packet loss rate required by the call.

Here, as before, all the packets to be entered are assumed to be of a fixed length, and each packet is assumed to take a unit time for being transferred to the multiplexed line.

In this method, L types of calls are to be multiplexed, with a number of the type-i calls (i = 1, ..., L) being $N_i$. The peak bit rate of the type-i call is denoted as $V_{mi}$, and the average bit rate of the type-i calls is denoted as $V_{ai}$. Among all the multiplexed calls, the peak bit rate of those calls which have the largest peak bit rate will be denoted as $V_{m0}$. The period T can be expressed as an inverse of this largest peak bit rate $V_{m0}$. Thus, the multiplexed line can transfer T packets during this period T, while each call transfer at most one packet during this period T. By estimating the packet loss rate under the assumption that those packets arriving in excess of T packets within the period T will be discarded, the estimated packet loss rate can always be greater than the actual packet loss rate, so that the quality of service can always be maintained at the satisfactory level.

Now, the packet loss rate CLR is given by:

$$CLR = \frac{1}{\rho T} \sum_{k > T} (k - T) \cdot P_k \qquad (1)$$

where $\rho$ is a load.

In this expression, $$P_k = \sum_{i_1 + \ldots + i_L = k} \prod_{j=1}^{L} \binom{N_j}{i_j} (a_j)^{i_j} (1 - a_j)^{N_j - i_j} \qquad (2)$$

where $$a_j = V_{aj}/V_{mj}$$

$$\rho = \sum_{j=1}^{L} N_j \cdot V_{aj}$$

and $$\binom{N_j}{i_j}$$

denotes a combination, which indicates the probability for k packets to be transferred from the entire calls during the period T.

When one type-j call is newly set up, the new packet loss rate CLR' will be given by:

$$CLR' = (1 - a_j) \frac{\rho T \cdot CLR}{\rho' T} + \qquad (3)$$

$$a_j \frac{1}{\rho' T} \sum_{k \geq T} [k - (T - 1)] \cdot P_k$$

$$= \frac{\rho}{\rho'} CLR - a_j \frac{\rho}{\rho'} CLR +$$

$$\frac{a_j}{\rho' T} \sum_{k \geq T} [k - (T - 1)] \cdot P_k$$

$$= \frac{\rho}{\rho'} CLR + \frac{a_j}{\rho' T} \left\{ \sum_{k \geq T} (k - T + 1) \cdot P_k - \sum_{k > T} (k - T) \cdot P_k \right\}$$

$$= \frac{\rho}{\rho'} CLR + \frac{a_j}{\rho' T} \sum_{k \geq T} P_k$$

$$= \frac{\rho}{\rho'} CLR + \frac{a_j}{\rho' T} \left[ 1 - \sum_{k=0}^{T-1} P_k \right]$$

where $$\rho' = \rho + V_{aj}$$

and $P_k$ will also be renewed to $P_k'$ given by:

$$P_0' = (1 - a_j) P_0$$

$$P_k' = (1 - a_j) P_k + a_j P_{k-1}, \ 1 \leq k \leq T - 1 \qquad (4)$$

The calculation required for these equations (3) and (4) is of the order of T.

On the other hand, when one type-j call is newly released, the new packet loss rate CLR' will be given by:

$$CLR' = \frac{\rho'}{\rho} CLR - \frac{a_j}{\rho' T} \left[ 1 - \sum_{k=0}^{T-1} P_k \right] \qquad (5)$$

where $$\rho' = \rho - V_{aj}$$

and $P_k$ will also be renewed to $P_k'$ given by:

$$P_0' = P_0/(1 - a_j)$$

$$P_k' = \{P_k - a_j P_{k-1}\}/(1 - a_j) \qquad (6)$$

Now, $N_i$ of the type-i calls can transfer exactly $N_i$ packets during a period of $T_i = 1/V_{mi}$ at the speed of the peak bit rate $V_{mi}$. Thus, in effect, it can be regarded that $N_i$ of the type-i calls transfer $N_i T/T_i$ packets during the period T. On the other hand, a single call of the largest peak bit rate $V_{m0}$ can transfer exactly one packets during the period T. Therefore, in effect, $N_i$ of the type-i calls can be regarded as $N_i T/T_i = N_i V_{mi}/V_{m0}$ calls of the largest peak bit rate $V_{m0}$. Here, however, since a quantity $N_i V_{mi}/V_{m0}$ may not necessarily takes an integer value, the packet loss rate will actually be estimated by using a weighted average of $[N_i V_{mi}/V_{m0}]$ and $[N_i V_{mi}/V_{m0}] + 1$, where square brackets [x] denotes the largest integer value not greater than the argument x. The cases $[N_i V_{mi}/V_{m0}]$ and $[N_i V_{mi}/V_{m0}] + 1$ are weighted by probability weights $a_{i0}$ and $a_{i1}$, respectively, where $a_{i0}$ and $a_{i1}$ are given by the following expressions:

$$a_{i0} = [N_i V_{mi}/V_{m0}] + 1 - N_i V_{mi}/V_{m0}$$

$$a_{i1} = 1 - a_{i0} \qquad (7)$$

The calculation required for the weighted average is of the order of $2^L$, which becomes progressively large as the number of types of calls L increases. However, since only one pair of $a_{i0}$ and $a_{i1}$ will be changed when one call is newly set up or released, so that the calculation of the order of T will suffices actually.

The actual calculation are carried out as follows.

Namely, the defining $R_k(i, n_i)$ as the probability for k packets to be transferred from the multiplexed calls when the number of tye type-i calls is equal to $n_i = [N_i V_{mi}/V_{m0}]$ and the number of the type-j calls is given by the weighted average of $n_j = [N_j V_{mj} V_{m0}]$ and $n_j + 1$, then $P_k$ and $P_k$ have the relationships:

$$P_k = a_{i0} R_k(1, n_i) + a_{i1} R_k(i, n_i + 1), \ 1 \leq k \leq T - 1$$

$$R_0(i, n_i + 1) = (1 - a_i) R_0(i, n_i)$$

$$R_k(1, n_i + 1) = a_i R_{k-1}(i, n_i) + (1 - a_i) R_k(i, n_i),$$
$$1 \leq k \leq T - 1 \qquad (8)$$

Here, since $a_{i0}$ and $a_{i1}$ are known, $R_k(1, n_i)$ can be obtained once the $P_k$ is known.

Now, by defining $CLR_i(n_i)$ as the packet loss rate when the number of the type-i calls is equal to $n_i$ and the number of the type-j calls is given by the weighted average of $n_j$ and $n_j+1$, the packet loss rate CLR can be given by:

$$CLR = \rho_0 a_{i0} CLR_i(n_i) + \rho_1 a_{i1} CLR_i(n_i+1) \qquad (9)$$

where $\rho_0$ is the offered load when the number of the type-i calls is equal to $n_i$ and $\rho_1$ is the offered load when the number of the type-i calls is equal to $n_i+1$.

On the other hand, $CLR_i(n_i+1)$ can also be expressed, by using the equation (3) above, as:

$$CLR_i(n_i + 1) = \frac{\rho_0}{\rho_1} CLR_i(n_i) + \frac{a_i}{\rho_1 T}\left\{ 1 - \sum_{k=0}^{T-1} R_k(i, n_i) \right\} \qquad (10)$$

so that from these equations (9) and (10) and the knowledge of CLR and $R_k(i, n_i)$, both $CLR_i(n_i)$ and $CLR_i(n_i+1)$ can be obtained.

In other words, $CLR_i(n_i)$ and $CLR_i(n_i+1)$ can be obtained from the knowledge of $a_{i0}$, $a_{i1}$, $P_k$ and CLR.

Thus, when one type-i call is newly set up, in which case the number of the type-i call increases from $N_i$ to $N_i+1$, if $[N_i V_{mi}/V_{m0}] = n_i = [(N_i+1)V_{mi}/V_{m0}]$, then CLR' and $P_k'$ can be obtained by:

$$CLR' = \frac{\rho_0 a_{i0}' CLR_i(n_i) + \rho_1 a_{i1}' CLR_i(n_i + 1)}{\rho'} \qquad (11)$$

$$P_k' = a_{i0}' R_k(i, n_i) + a_{i1}' R_k(i, n_i + 1) \qquad (12)$$

where $$\left. \begin{array}{l} a_{i0}' = [(N_i + 1)V_{mi}/V_{m0}] + 1 - (N_i + 1)V_{mi}/V_{m0} \\ a_{i1}' = 1 - a_{i0} \end{array} \right\} \qquad (13)$$

On the other hand, if $[N_i V_{mi}/V_{m0}] = n_i$ and $[(N_i + 1)V_{mi}/V_{m0}] = n_i + 1$, then:

$$CLR' = \frac{\rho_1 a_{i0}' CLR_i(n_i + 1) + \rho_2 a_{i1}' CLR_i(n_i + 2)}{\rho'} \qquad (14)$$

where $\rho_2$ is the offered load when the number of the type-i calls is equal to $n_i+2$, but $CLR_i(n_i+2)$ can be obtained from $CLR_i(n_i+1)$, so that CLR' is still obtainable from the knowledge of $a_{i0}$, $a_{i1}$, $P_k$ and CLR.

As an example, a case of L=2 can be explicitly be worked out as follows.

Here, $N_1$ of the type-1 calls having the maximum transfer speed of $V_{m1}$ and the average transfer speed of $V_{a1}$, and $N_2$ of the type-2 calls having the maximum transfer speed of $V_{m2}$ and the average transfer speed of $V_{a2}$ are set up, where $V_{m1} > V_{m2}$ so that $V_{m0} = V_{m1}$.

In this case, when $[N_1 V_{m1}/V_{m0}] = N_1 = n_1$ and $[N_2 V_{m2}/V_{m0}] = n_2$, the packet loss rate CLR is given by:

$$CLR = \frac{\rho_0 a_{20} CLR(n_1, n_2) + \rho_1 a_{21} CLR(n_i, n_2 + 1)}{\rho}$$

where $$a_{20} = n_2 + 1 - N_2 V_{m2}/V_{m1}$$
$$a_{21} = 1 - a_{20}$$

and $CLR(n_1, n_2)$ represents the packet loss rate when the number of the type-1 calls is $n_1$ and the number of type-2 calls is $n_2$.

Now, then the set up of the type-2 call, which is the low speed call, is requested, if $[(N_2+1)V_{m2}/V_{m0}] = n_2$, then the new packet loss rate CLR' is given by:

$$CLR' = \frac{\rho_0 a_{20}' CLR(n_1, n_2) + \rho_1 a_{21}' CLR(n_1, n_2 + 1)}{\rho'}$$

where $$a_{20}' = n_2 + 1 - (N_2 + 1) V_{m2}/V_{m1}$$

$$a_{21}' = 1 - a_{20}'$$

In this case, $$CLR(n_1, n_2 + 1) = \frac{\rho_0}{\rho_1} CLR(n_1, n_2) + \frac{a_2 \left\{ 1 - \sum_{k=0}^{T-1} R_k(n_1, n_2) \right\}}{\rho_1 T}$$

where $Rk(n_1, n_2)$ is the probability that k packets arrive when the number of the type-1 calls is $n_1$ and the number of the type-2 calls is $n_2$.

On the other hand, when the set up of the type-2 call is requested, if $[(N_2+1)V_{m2}/V_{m0}] = n_2+1$, then the new packet loss rate CLR' is given by:

$$CLR' = \frac{\rho_1 a_{20}' CLR(n_1, n_2 + 1) + \rho_2 a_{21}' CLR(n_1, n_2 + 2)}{\rho'}$$

where $$a_{20}' = n_2 + 1 - (N_2 + 1) V_{m2}/V_{m1}$$

$$a_{21}' = 1 - a_{20}'$$

This method just described in detail can actually be carried out according to the flow chart of FIG. 18, as follows.

Here, the numbers $\{N_i\}$ of the type-i calls currently set up, the probabilities $\{P_j | 0 \leq j \leq T-1\}$ of j packets to arrive in the period T, the load $\rho$, and the current packet loss rate CLR are memorized, from which the new packet loss rate CLR' will be derived as explained above, for the sake of the call set up control.

Thus, first, at the step 301, the initial values for the numbers $\{N_i\}$ of the type-i calls currently set up, the probabilities $\{P_j | 0 \leq j \leq T-156$ of j packets to arrive in the period T, the offered load $\rho$, and the current packet loss rate CLR are set.

Then, when the set up of the type-i call is requested at the step 302, the probability $R_j(i, n_i) = R_j(i, [N_i V_{mi}/V_{m0}])$ is read out at the step 303, and from this probability $R_j(i, n_i) = R_j(i, [N_i V_{mi}/V_{m0}])$, the packet loss rate $CLR_i(n_i) = CLR_i([N_i V_{mi}/V_{m0}])$ for the case in which the number of the type-i calls is $n_i$ and the packet loss rate $CLR(n_i+1) = CLR([N_i V_{mi}/V_{m0}]+1)$ for the case in which the number of the type-i calls is $n_i+1$ are derived at the step 304.

Next, at the step 305, values of $[N_i V_{mi}/V_{m0}]$ and $[(N_i+1)V_{mi}/V_{m0}]$ are compared in order to distinguish the case in which $[(N_i+1)V_{mi}/V_{m0}] = n_i$ and the case in which $[(N_i+1)V_{mi}/V_{m0}] = n_i+1$.

When the values of $[N_i V_{mi}/V_{m0}]$ and $[(N_i+1)V_{mi}/V_{m0}]$ are equal, i.e., when $[(N_i+1)V_{mi}/V_{m0}] = n_i$, the new packet loss rate CLR' is obtained at the step 307, from $CLR_i(n_i) = CLR_i([N_iV_{mi}/V_{m0}]$ and $CLR_i(n_i+1) = CLR_i([N_iV_{mi}/V_{m0}]+1)$ derived at the step 304.

Whereas when the values of $[N_iV_{mi}/V_{m0}]$ and $[(N_i+1)V_{mi}/V_{m0}]$ are not equal, i.e., when $[(N_i+1)V_{mi}/V_{m0}] = n_i30 \quad 1, \quad CLR(n_i+1) = CLR([(N_i+1)V_{mi}/V_{m0}])$ for the case in which the number of the type-i calls is $n_i+1$ and the packet loss rate $CLR(n_i+2) = CLR([(N_i+1)V_{mi}/V_{m0}]+1)$ for the case in which the number of the type-i calls is $n_i+2$ are re-derived for this case at the step 306, and the new packet loss rate CLR' is obtained at the step 307, from $CLR_i(n_i+1) = CLR_i([(N_i+1)V_{mi}/V_{m0}])$ and $CLR_i(n_i+2) = CLR_i([(N_i+1)V_{mi}/V_{m0}]+1)$ derived at the step 306.

Then at the step 308, the new packet loss rate CLR' obtained at the step 307 is compared with the packet loss rate requested by the entire calls including one just being requested, and whether to grant an admission or reject the call set up request is determined according to whether the required packet loss rate can be satisfied by granting an admission to the set up of this call.

When the request is to be rejected, the process returns to the step 302 above to wait for the next request whereas when the request is to be granted an admission, the memorized values of the numbers $\{N_i\}$ of the type-i calls currently set up, the probabilities $\{P_j | 0 \leq j \leq T-1\}$ of j packets to arrive in the period T, the current packet loss rate CLR, and the current offered load $\rho$ are renewed to new values obtained by the calculations in the process described above.

Here, there is no need to calculate all the probabilities $P_j$ for all possible combinations of types of calls, so that the amount of calculation will not increase even when the number of call types increases.

Now, the priority control utilizing the communication speeds in the packet network according to the present invention will be described in detail.

According to the present invention, the high speed call is defined to be that for which a ratio of the maximum transfer speed of the call with respect to the transfer speed of the multiplexed line is greater than a prescribed value, while the low speed call is defined to be that which is not the high speed call.

Then, when the sum of the maximum transfer speed of the high speed calls is not greater than the transfer speed of the multiplexed line, all the packets generated by the high speed calls are transferred at a peak bit rate, i.e., at the maximum transfer speed. By means of this, the quality of service for the high speed calls, which tended to be poorer conventionally, can be secured to be at the satisfactory level.

More specifically, such a priority control can be achieved in several different manners, which will now be described in detail.

Figure 19:
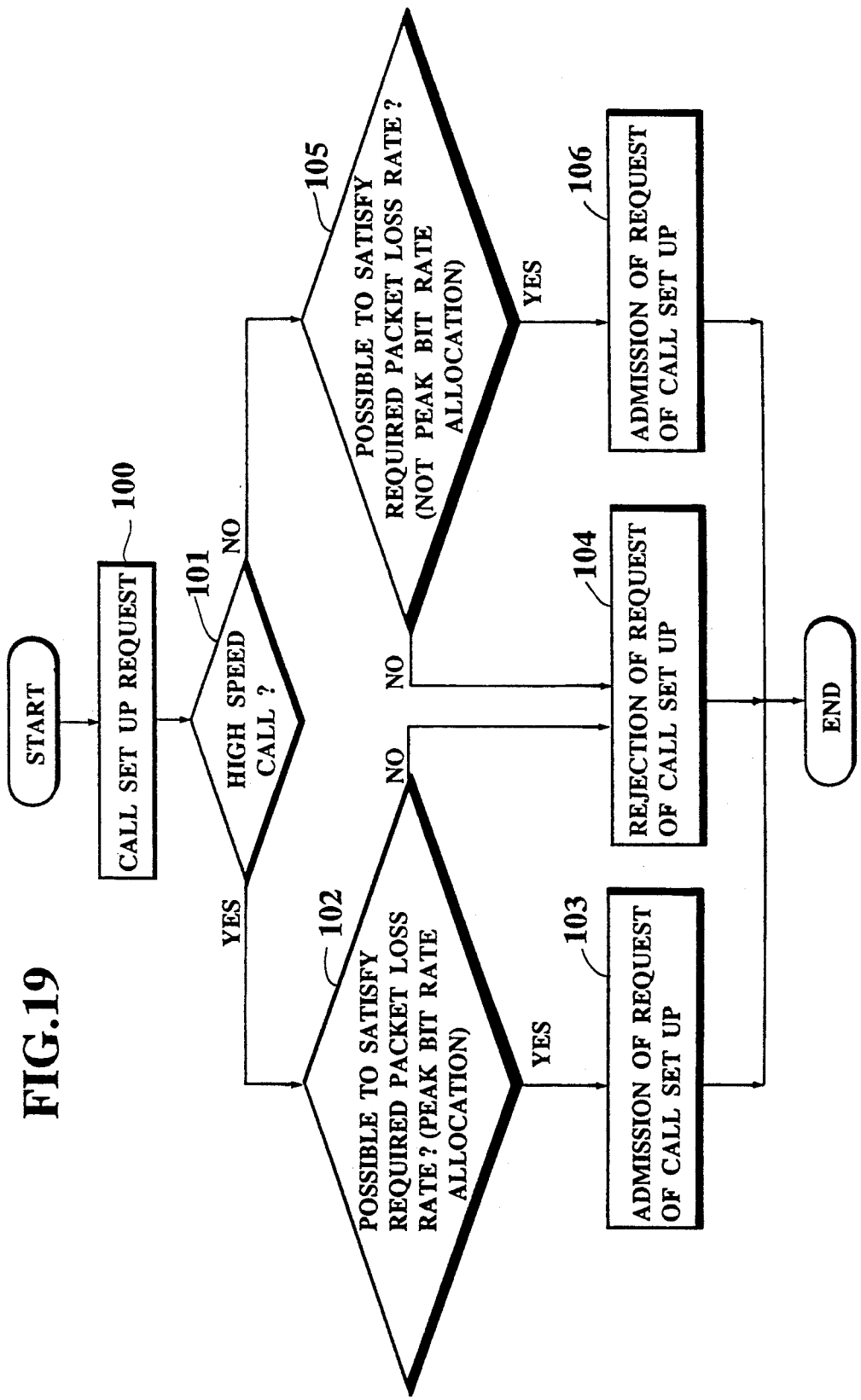
FIG. 19 is a flow chart for one possible operation of the call set up control with priority control, to be performed in the packet network of FIG. 4.

The first manner of the priority control is for a case in which the division of the communication resource into the sub-resources $r_i$ is fixed, in which the packet exchanger 10 is operated according to a flow chart of FIG. 19 as follows.

Namely, in this case, the communication resource is divided up into N distinct sub-resources $r_i$, either physically or logically, in correspondence with N different classes Ci, where each sub-resource $r_i$ is allocated to each class Ci without overlaps. Here, a size of each sub-resource $r_i$ is predetermined according to the number of calls to be granted an admission to each sub-resource $r_i$ or expected to be granted an admission to each sub-resource $r_i$.

Now, in response to a communication request of call set up accompanies by a quality of service requirement generated at the step 100, the packet exchanger 10 determines whether the this communication request of call set up is the high speed call or the low speed call at the step 101.

At this point, a state of the traffic for this sub-resource $r_i$ is known to the packet exchanger 10.

Thus, when the communication request of call set up is determined as the high speed call at the step 101, next at the step 102, the packet exchanger 10 can determine whether it is possible to maintain the satisfactory quality of service for all communications of this class Ci after the admission of this communication request of call set up, assuming that the peak bit rate is allocated for this communication request of call set up.

The communication request of call set up is granted an admission only when the packet exchanger 10 judges that it is possible to satisfy the requirement for quality of service for all communications of this class Ci after the admission of this communication request of call set up. In such a case, the communication request of call set up is granted an admission at the step 103, whereas otherwise the communication request of call set up is rejected at the step 104.

On the other hand, when the communication request of call set up is determined as the low speed call at the step 101, next at the step 105, the packet exchanger 10 can determine whether it is possible to maintain the satisfactory quality of service for all communications of this class Ci after the admission of this communication request of call set up. Here, in contrast to the case of the high speed call, the allocation of the peak bit rate for this communication request of call set up is not assumed.

The communication request of call set up is granted an admission only when the packet exchanger 10 judges that it is possible to satisfy the requirement for quality of service for all communications of this class Ci after the admission of this communication request of call set up. In such a case, the communication request of call set up is granted an admission at the step 106, whereas otherwise the communication request of call step up is rejected at the step 104.

Figure 20:
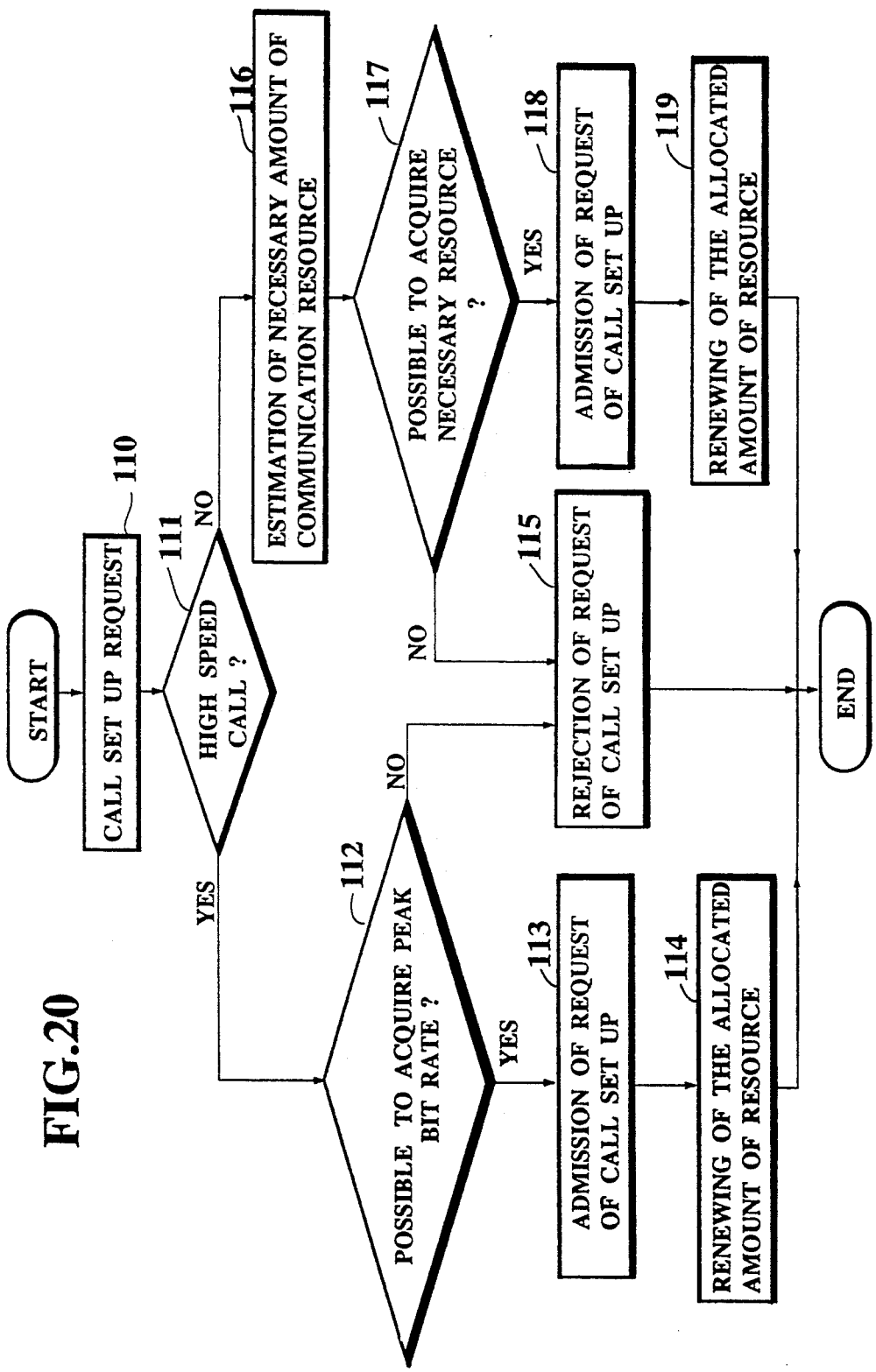
FIG. 20 is a flow chart for another possible operation of the call set up control with priority control, to be performed in the packet network of FIG. 4.

Alternatively, for the case in which the division of the communication resource into the sub-resources $r_i$ is fixed, the packet exchanger 10 may be operated to perform the priority control according to a flow chart of FIG. 20 as follows.

Namely, here again, the communication resource is divided up into N distinct sub-resources $r_i$, either physically or logically, in correspondence with N different classes $C_i$, where each sub-resource $r_i$ is allocated to each class Ci without overlaps. Here, a size of each sub-resource $r_i$ is predetermined according to the number of calls to be granted an admission to each sub-resource $r_i$ or expected to be granted an admission to each sub-resource $r_i$.

Now, in response to a communication request of call set up accompanied by a quality of service requirement generated at the step 110, the packet exchanger 10 determines whether the this communication request of call set up is the high speed call or the low speed call at the step 111.

At this point, the amount of allocated communication resource for the already accommodated calls for this class is known to the packet exchanger 10.

Thus, when the communication request of call set up is determined as the high speed call at the step 101, next at the step 102, the packet exchanger 10 can determine whether it is possible to acquire the necessary amount of resource from the sub-resource allocated to this class.

The communication request of call set up is granted an admission only when the packet exchanger 10 judges that it is possible to acquire the necessary amount of resource. In such a case, the communication request of call set up is granted an admission at the step 113, with the necessary amount of resource acquired form the sub-resource allocated to this class, and the amount of allocated communication resource for the already accommodated calls for this class is renewed at the step 114, whereas otherwise the communication request of call set up is rejected at the step 115.

On the other hand, when the communication request of call set up is determined as the low speed call at the step 111, next at the step 116, the packet exchanger 10 can determine whether it is possible to acquire the necessary amount of resource from the sub-resource allocated to this class.

The communication request of call set up is granted an admission only when the packet exchanger 10 judges that it is possible to acquire the necessary amount of resource. In such a case, the communication request of call set up is granted an admission at the step 118, with the necessary amount of resource required from the sub-resource allocated to this class, and the amount of allocated communication resource for the already accommodated calls for this class is renewed at the step 119, whereas otherwise the communication request of call set up is rejected at the step 115.

Figure 21B:
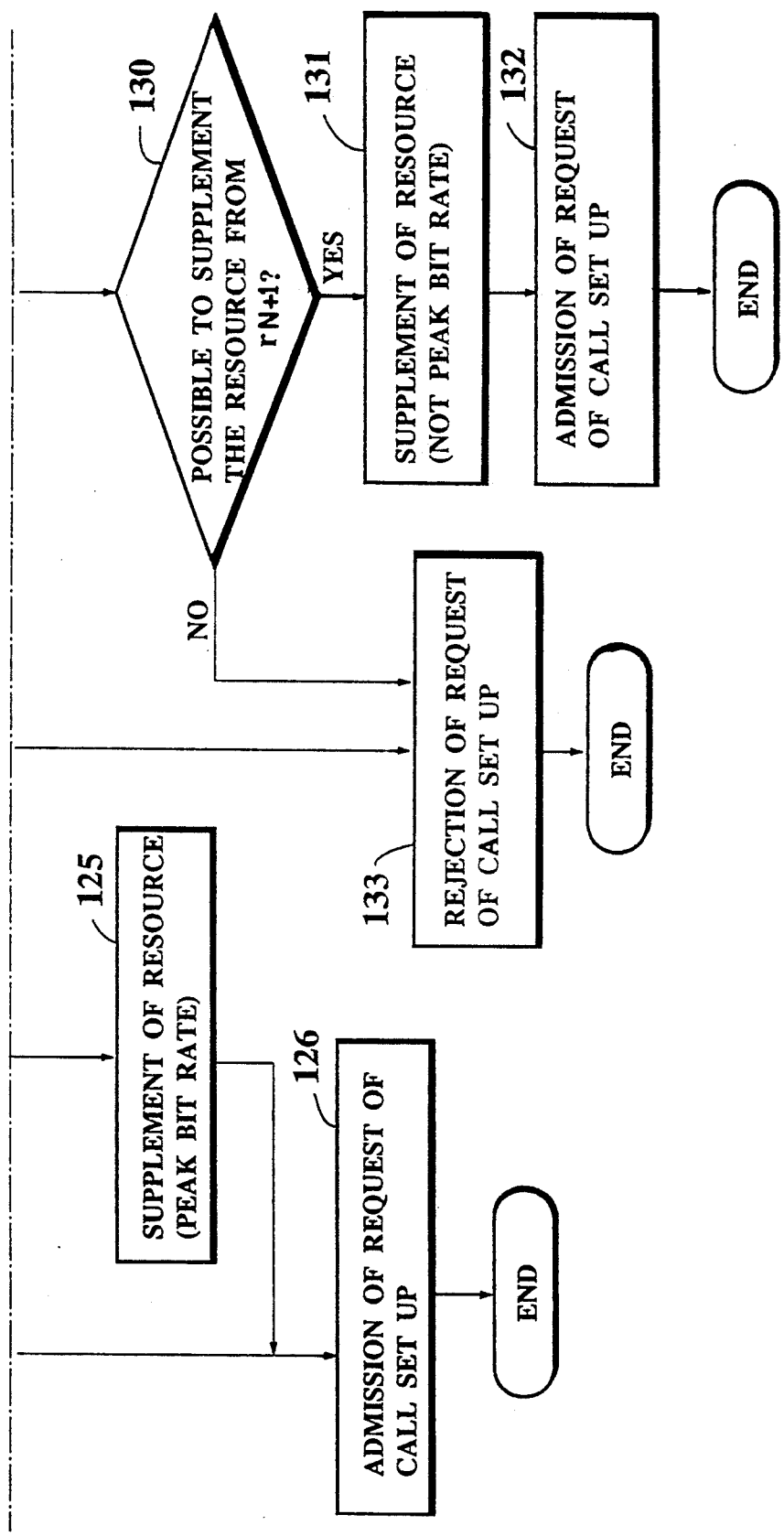

Another manner of the priority control is for a case in which at least one of the sub-resource $r_i$ is utilized as a reserve, in which the packet exchanger 10 is operated according to a flow chart of FIG. 21 as follows.

Namely, in this case, the communication resource is divided up into $N+1$ distinct sub-resources $r_j$ (j=1,2,—N, N+1), either physically or logically, in correspondence with N different classes Ci (i=1, 2,—, N), where each sub resource $r_i$ is allocated to each class Ci without overlaps, while one additional sub-resource $r_{N+1}$ is left as a reserve. Here, the reserve sub-resource $r_{N+1}$ is not used when the communications can be handled by the other N sub-resources $r_i$.

Now, in response to a communication request of call set up accompanied by a quality of service requirement generated at the step 121, the packet exchanger 10 determines whether the this communication request of call set up is the high speed call or the low speed call at the step 122.

At this point, a state of the traffic for this sub-resource $r_i$ is known to the packet exchanger 10.

Thus, when the communication request of call set up is determined as the high speed call at the step 122, next at the step 123, the packet exchanger 10 can determine whether it is possible to maintain the satisfactory quality of service for all communications of this class Ci after the admission of this communication request of call set up, assuming that the peak bit rate is allocated for this communication request of call set up.

The communication request of call set up is granted an admission only when the packet exchanger 10 judges that it is possible to satisfy the requirement for quality of service for all communications of this class Ci after the admission of this communication request of call set up. In such a case, the communication request of call set up is granted an admission at the step 126.

On the other hand, in this case, when the packet exchanger 10 judges that it is not possible to satisfy the requirement for quality of service for all communications of this class Ci after the admission of this communication request of call set up, an amount of resource necessary to guarantee the required quality of service is estimated and whether such an amount of resource can be supplemented from the reserve sub-resource $r_{N+1}$ is determined at the step 124, assuming that the peak bit rate is allocated for this communication request of call set up.

If so, the necessary amount of resource is supplemented from the reserve sub-resource $r_{N+1}$ at the step 125, and the pending communication request of call set up is granted an admission by using this supplemented resource at the step 126.

Otherwise, the pending communication request of call set up is rejected at the step 133.

On the contrary, when the communication request of call set up determined as the low speed call at the step 122, next at the step 127, the packet exchanger 10 can determine whether it is possible to maintain the satisfactory quality of service for all communications of this class Ci after the admission of this communication request of call set up. Here, in contrast to the case of the high speed call, the allocation of the peak bit rate for this communication request of call set up is not assumed.

The communication request of call set up is granted an admission only when the packet exchanger 10 judges that it is possible to satisfy the requirement for quality of service for all communications of this class Ci after the admission of this communication request of call set up. In such a case, the communication request of call set up is granted an admission at the step 128.

On the other hand, in this case, when the packet exchanger 10 judges that it is not possible to satisfy the requirement for quality of service for all communications of this class Ci after the admission of this communication request of call set up, a deficiency in amount of resource necessary to guarantee the required quality of service is estimated at the step 129 and whether such an amount of resource can be supplemented from the reserve sub-resource $r_{N+1}$ is determined at the step 130.

If so, the deficient resource is supplemented from the reserve sub-resource $r_{N+1}$ at the step 131, and the pending communication request of call set up is granted an admission by using this supplemented resource at the step 132.

Otherwise, the pending communication request of call set up is rejected at the step 133.

Figure 22B:
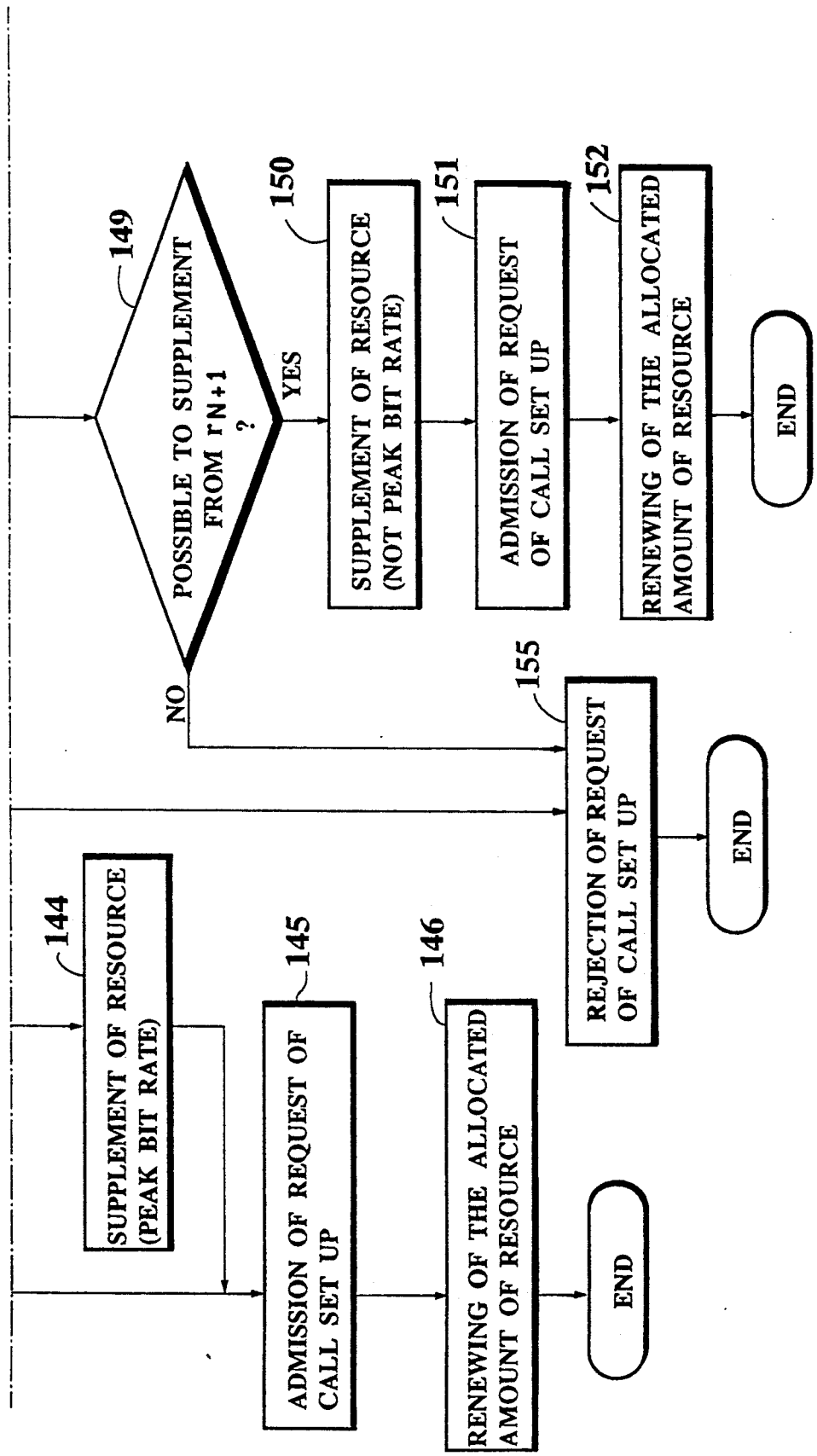

Alternatively, for the case in which at least one of the sub-resources $r_i$ is utilized as a reserve, the packet exchanger 10 may be operated to perform the priority control according to a flow chart of FIG. 22 as follows.

Namely, here again, the communication resource is divided up into $N+1$ distinct sub-resource $r_j$ (j=1,2,—N, N+1), either physically or logically, in correspondence with N different classes Ci (i=1, 2,—N), where each sub-resource $r_i$ is allocated to each class Ci without overlaps, while one additional sub-resource $r_{N+1}$ is left as a reserve. Here, the reserve sub-resource $r_{N+1}$ is not used when the communications can be handled by the other N sub-resources $r_i$.

Now, in response to a communication request of call set up accompanied by a quality of service requirement generated at the step 140, the packet exchanger 10 determines whether the this communication request of call set up is the high speed call or the low speed call at the step 141.

At this point, the amount of allocated communication resource for the already accommodated calls for this class is known to the packet exchanger 10.

Thus, when the communication request of call set up is determined as the high speed call at the step 141, next at the step 142, the packet exchanger 10 can determine whether it is possible to acquire the necessary amount of resource from the sub-resource allocated to this class, assuming that the peak bit rate is allocated for this communication request of call set up.

The communication request of call set up is granted an admission only when the packet exchanger 10 judges that it is possible to acquire the necessary amount of resource. In such a case, the communication request of call set up is granted an admission at the step 145, with the necessary amount of resource acquired from the sub-resource allocated to this class, and the amount of allocated communication resource for the already accommodated calls for this class is renewed at the step 146.

On the other hand, in this case, when the packet exchanger 10 judges it is not possible to acquire the necessary amount of resource from the sub-resource allocated to this class, an amount of resource necessary to guarantee the required quality of service is estimated and whether such an amount of resource can be supplemented from the reserve sub-resource $r_{N+1}$ is determined at the step 143, assuming that the peak bit rate is allocated for this communication request of call set up.

If so, the necessary amount of resource is supplemented from the reserve sub-resource $r_{N+1}$ at the step 144, and the pending communication request of call set up is granted an admission by using this supplemented resource at the step 145.

Otherwise, the pending communication request of call set up is rejected at the step 155.

On the contrary, when the communication request of call set up is determined as the low speed call at the step 141, next, an amount of resource necessary to guarantee the required quality of service is estimated at the step 147, and the packet exchanger 10 can determine whether it is possible to acquire the necessary amount of resource from the sub-resource allocated to this class at the step 148.

The communication request of call set up is granted an admission only when the packet exchanger 10 judges that it is possible to acquire the necessary amount of resource. In such a case, the communication request of call set up is granted an admission at the step 153, with the necessary amount of resource acquired from the sub-resource allocated to this class, and the amount of allocated communication resource for the already accommodated calls for this class is renewed at the step 154.

On the other hand, in this case, when the packet exchanger 10 judges that it is possible to acquire the necessary amount of resource from the sub-resource allocated to this class, whether such an amount of resource can be supplemented from the reserve sub-resource $r_{N+1}$ is determined at the step 149.

If so, the necessary amount of resource is supplemented from the reserve sub-resource $r_{N+1}$ at the step 150, the pending communication request of call set up is granted an admission by using this supplemented resource at the step 151, and the amount of allocated communication resource for the already accommodated calls for this class is renewed at the step 152.

Otherwise, the pending communication request of call set up is rejected at the step 155.

Figure 23:
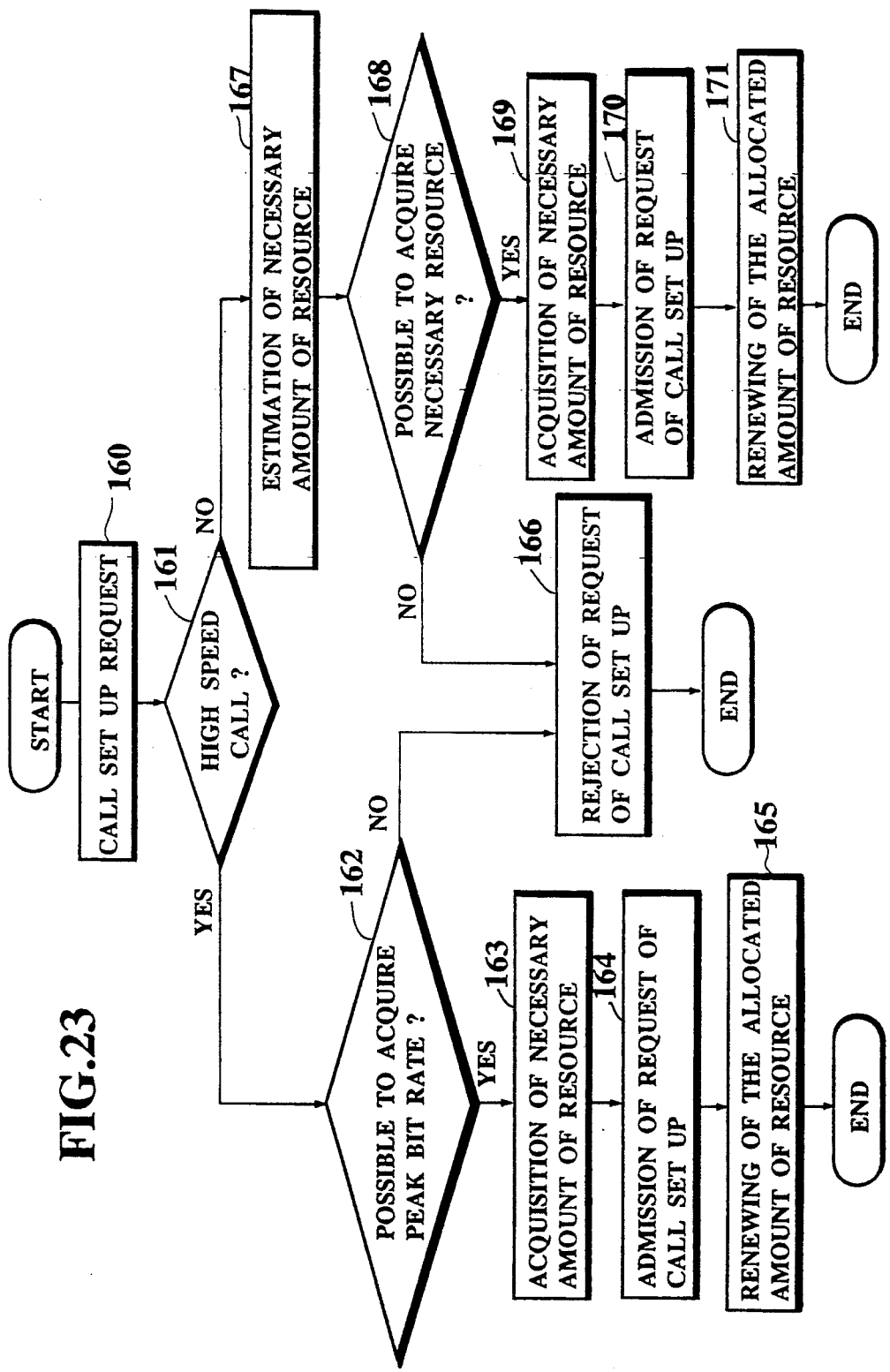
FIG. 23 is a flow chart for another possible operation of the call set up control with priority control, to be performed in the packet network of FIG. 4.

Still another manner of the priority control is for a case in which the division of the communication resource into the sub-resource $r_i$ is made to be dynamically variable, in which the packet exchanger 10 is operated according to a flow chart of FIG. 23 as follows.

Namely, in this case, the communication resource is not divided up into the sub-resources $r_i$ ($i = 1, 2, —, N$) in advance, but an attempt is made to allocate as much sub-resource of the communication resource as necessary to each class of communication whenever the communication request of call set up of a particular communication class is generated. When an additional new communication request call of a particular communication class is generated, an attempt is made to acquire as much additional sub-resource of the communication resource as necessary to maintain the required quality of service. Here, however, each sub-resource is still allocated uniquely to a particular class of communication as in the earlier cases, and not shared by different classes of communications.

Now, in response to a communication request of call set up accompanied by a quality of service requirement generated at the step 160, the packet exchanger 10 determines whether the this communication request of call set up is the high speed call or the low speed call at the step 161.

At this point, the amount of allocated communication resource for the already accommodated calls for this class is known to the packet exchanger 10.

Thus, when the communication request of call set up is determined as the high speed call at the step 161, next at the step 162, the packet exchanger 10 can determine whether it is possible to acquire the necessary amount of resource, assuming that the peak bit rate is allocated for this communication request of call set up.

The communication request of call set up is granted an admission only when the packet exchanger 10 judges that it is possible to acquire the necessary amount of resource. In such a case, the necessary amount of resource acquired at the step 163, the communication request of call set up is granted an admission at the step 164, and the amount of allocated communication resource for the already accommodated calls for this class is renewed at the step 165, whereas otherwise the communication request of call set up is rejected at the step 166.

On the contrary, when the communication request of call set up is determined as the low speed call at the step 161, next, a necessary amount of resource is estimated at the step 167, and the packet exchanger 10 can determine whether it is possible to acquire the necessary amount of resource at the step 168.

The communication request of call set up is granted an admission only when the packet exchanger 10 judges that it is possible to acquire the necessary amount of resource. In such a case, the necessary amount of resource acquired at the step 169, the communication request of call set up is granted an admission at the step 170, and the amount of allocated communication resource for the already accommodated calls for this class is renewed at the step 171, whereas otherwise the communication request of call set up is rejected at the step 166.

Figure 24:
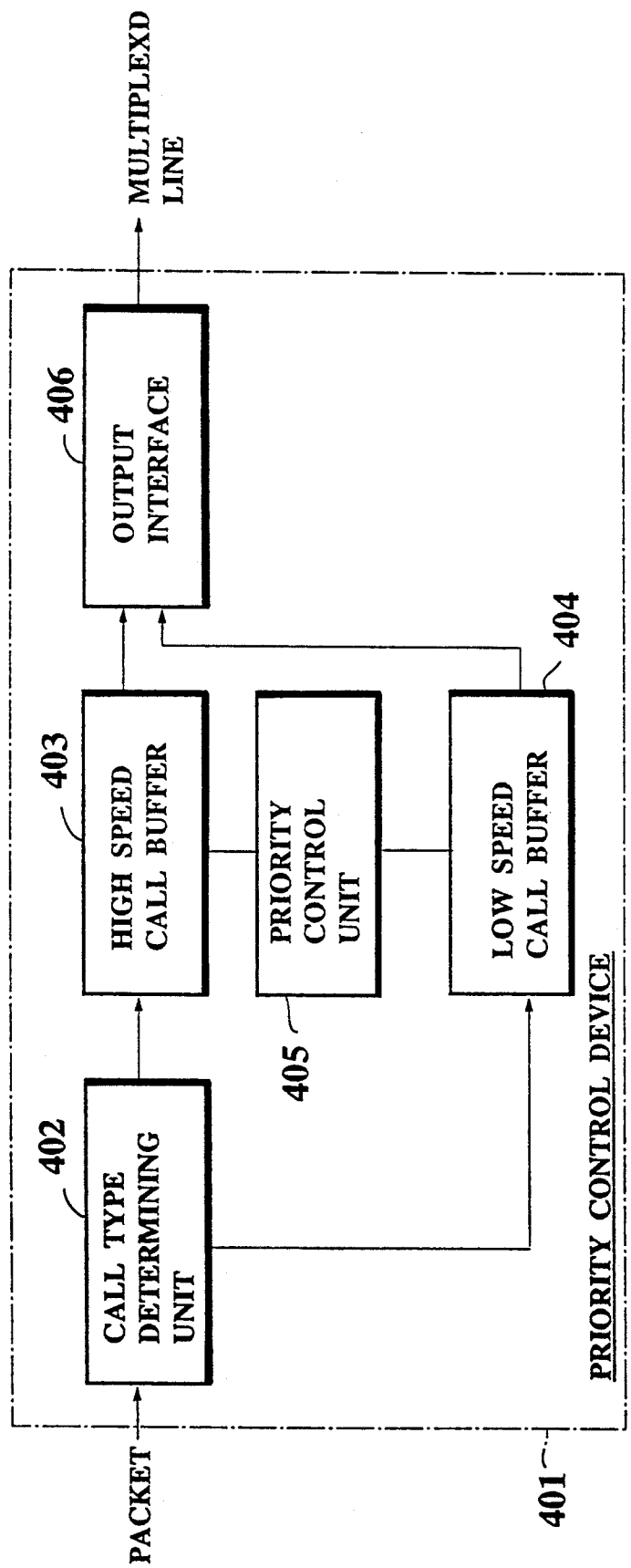
FIG. 24 is a schematic block diagram of a priority control device to perform the priority control according to the flow chart of FIGS. 19 to 23.
Figure 25:
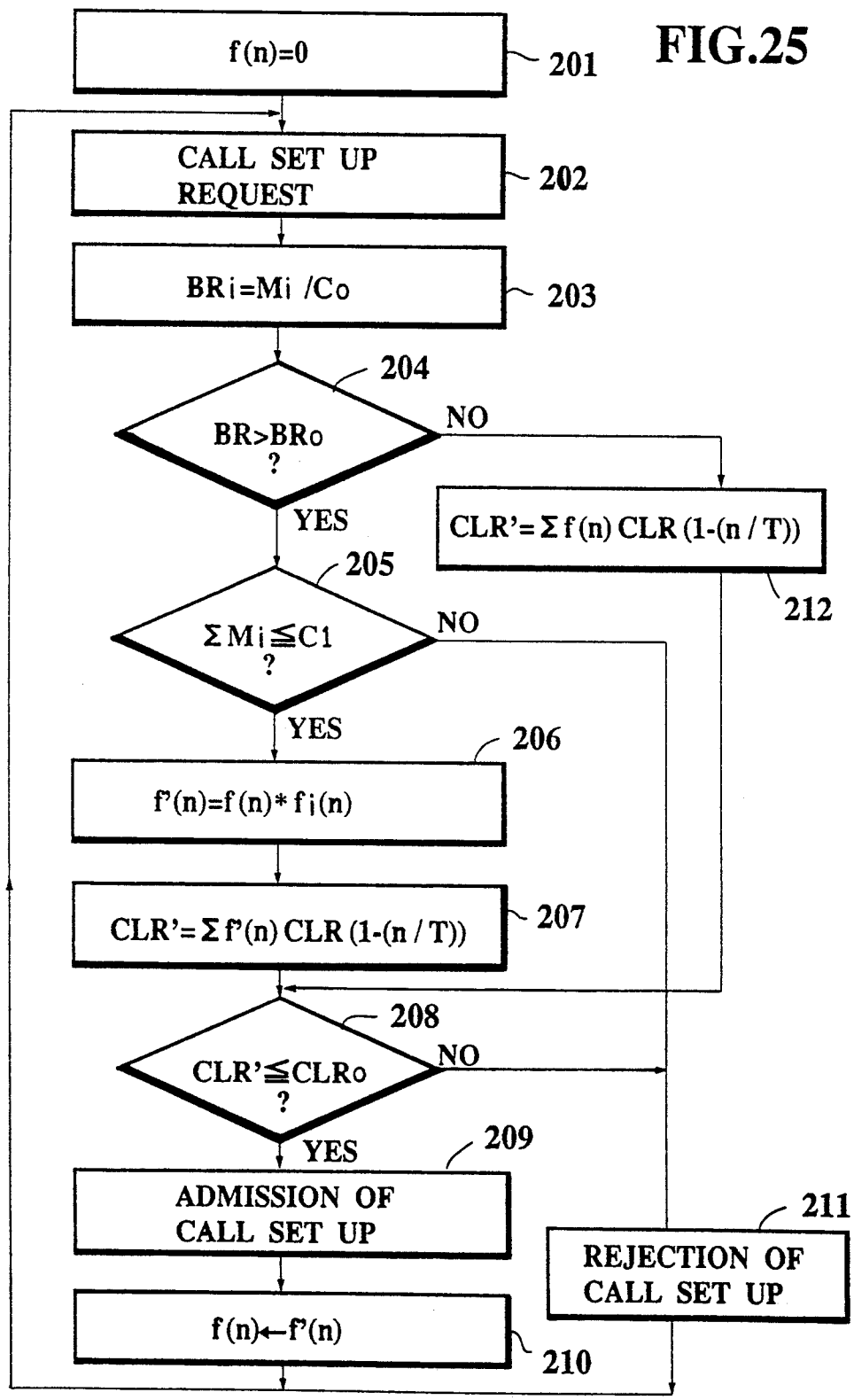
FIG. 25 is a flow chart for one method of estimating the packet loss rate in the call set up control with priority control according to the flow chart of FIGS. 19 to 23.

The priority control procedures described above can be performed by a priority control device 401 such as that shown in FIG. 24, which comprises a call type determining unit 402 for determining the call type of the packet inputted as either one of the high speed call and the low speed call, a high speed call buffer 403 for storing the packets generated by the call which has been determined as the high speed call by the call type determining unit 402, a low speed call buffer 404 for storing the packets generated by the call which has been determined as the low speed call by the call type determining unit 402, a priority control unit 405 for controlling the high and low speed call buffers 403 and 404 such that all the packets generated by the high speed call are transferred at the peak bit rate, with the priority over the packets generated by the low speed call, and an output interface 406 for outputting the packets from the high and low speed buffers 403 and 404 in the multiplexed line.

Thus, in the call set up control using one of the priority control procedures described above, once the call is set up, none of the packets generated by the high speed call is discarded, so that the satisfactory quality of service can be obtained for the high speed call. On the other hand, only those low speed calls to which the required packet loss rate can be realized are set up, so that the packet loss rate for the low speed call does not deteriorate either.

Now, in estimating the packet loss rate for the low speed call, there are different possible ranges for the bandwidth that can be taken to be relevant.

Namely, the packet loss rate may be estimated by using the bandwidth obtained by subtracting the bandwidth allocated to the high speed call which is the same as the sum of the peak bit rates from the entire bandwidth resource of the multiplexed line.

Alternatively, the packet loss rate may be estimated by using the entire bandwidth resource of the multiplexed line.

Now, the packet loss rate can be estimated by several methods, the details of which will now be described.

First, as a method that takes the effect of statistical multiplexing into account, there are that utilizes the probability density function and that utilizes the peak bit rate and the average bit rate.

In the method utilizing the probability density function, the call set up control for the low speed call is performed by using the probability density function which has a number of packets generated by each call as a variable. Namely, the traffic characteristic of each low speed call is expressed in terms of the probability density function having a number of packets generated within a predetermined period of time as a variable, the multiplexed traffic characteristic is obtained by taking convolution of the probability density function of each call, and the packet loss rate is estimated on a basis of this multiplexed traffic characteristic. This method has been described by the present inventors in Japanese Patent Application No. 1-23071(1989).

On the other hand, there is also a method in which the packet loss rate for the low speed call is estimated on a basis of the peak bit rate and the average bit rate.

In contrast, there is a method utilizing the bandwidth allocation at the peak bit rate alone, in which the call set up control of the low speed call as well as the high speed call is performed by utilizing the bandwidth allocation at the peak bit rate.

Referring now to FIG. 17, a detail of the method utilizing the probability density function will be described. This method is carried out according to the flow chart of FIG. 17, as follows.

Here, all the packets to be entered are assumed to be of a fixed length, and each packet is assumed to take a unit time for being transferred to the multiplexed line.

Also, as before, the call is determined as the high speed call when the ratio BR of the maximum transfer speed of the call with respect to the transfer speed of the multiplexed line is greater than a prescribed threshold value $BR_0$, whereas otherwise the call is determined as the low speed call.

In this method, when a sum of the maximum transfer speeds of the high speed calls is not greater than the transfer speed of the multiplexed line, all the packets due to the high speed call will be transferred without discarding any packet, and the packets due to the low speed call will be transferred only when there is no packet due to the high speed call to be transferred. This can be realized either by performing the priority control in the buffers in which the packets due to the high speed call are always given a priority over the packets due to the low speed call, or by allocating a fixed bandwidth equal to a sum of the maximum transfer speeds of the high speed call on the multiplexed line where the packets due to the low speed call are transferred only when there is no packet due to the high speed call with respect to this allocated bandwidth.

Also, in this method, the packet network is to be notified of the maximum transfer speed $M_i$ of the packets of the call from an i-th terminal at the time of call set up request.

In addition, the packet network is to be notified of a probability of $f_i(n)$ for transferring n packets in a time $T = 1/BR_0$ by the i-th terminal, where T is a time taken for transferring one packet by a terminal having the ratio of maximum transfer speed of the call with respect to the the transfer speed of the multiplexed line equal to $BR_0$. This information may be provided when each terminal is connected to the packet network initially.

Now, initially, when there is no terminal connected to the packet network, a probability f(n) for transferring n packets in a time $T = 1/BR_0$ by the entire high speed calls is set to an initial value "0" at the step 201.

Then, when the call set up request is made from the i-th terminal at the step 202, the ratio $BR_i = M_i/C_0$ of the maximum transfer speed $M_i$ of the call with respect to the transfer speed of the multiplexed line $C_0$ is calculated at the step 203, and whether the call is the high speed call or the low speed call is determined at the step 204 by comparing this $BR_i$ calculated at the step 203 with a prescribed threshold value $BR_0$. The call is determined as the high speed call when the ratio BR of the maximum transfer speed with respect to the speed of the multiplexed line is greater than a prescribed threshold value $BR_0$, whereas otherwise the call is determined as the low speed call, as already mentioned.

When the call is determined as the high speed call at the step 204, next, whether the sum of the maximum transfer speeds $\Sigma H_i$ of the entire high speed calls including the requesting one exceeds the bandwidth $C_1$ allocated to the high speed call is determined at the step 205.

If the sum of the maximum transfer speeds of the packets of the entire high speed calls including the requesting one exceeds the bandwidth $C_1$, then this call set up request is rejected at the step 211.

Otherwise, the packet loss rate CLR' for those low speed calls already set up will be calculated. This is done by first calculating a probability f'(n) for transferring n packets in a time $T=1/BR_0$ by the entire high speed calls including the requesting one, as the convolution $f(n)*f_r(n)$ of the probability f(n) and the probability $f_r(n)$ at the step 206, and then calculating the packet loss rate CLR' as an average $\Sigma f'(n)CLR(1-(n/T))$ of the packet loss rate $CLR(1-(n/T))$ obtained by assuming that the bandwidth of 1-(n/T) packets per unit time can be used at the probability f'(n).

On the other hand, when the call is determined as the low speed call at the step 204, next, at the step 212, the packet loss rate CLR' for the entire low speed calls including the requesting one is calculated as an average $\Sigma F(n)CLR(1-(n/T))$ of the packet loss rate $CLR(1-(n/T))$ obtained by assuming that the bandwidth of 1-(n/T) packets per unit time can be used at the probability f(n).

Then, this packet loss rate CLR' is compared with the packet loss rate $CLR_0$ required by the entire calls including the requesting call at the step 208.

Of the packet loss rate CLR' is less than the packet loss rate $CLR_0$, this call set up request is granted an admission at the step 209, and in such a case the probability f(n) is updated by the probability f'(n) at the step 210.

Otherwise, this call set up request is rejected at the step 211.

Then the process returns to the step 202, so that the same procedure will be carried out with respect to the next call set up request.

Thus, according to this method, the packet loss rate $CLR(1-(n/T))$ for the low speed calls with (1-(n/T)) packets per unit time of the bandwidth available is estimated under the assumption that those packets in excess of (T-n) packets in a given period T will be discarded. This assumption is equivalent to assuming that the bandwidth allocated to the high speed calls but considered to be not used by the high speed call is available to the low speed call. Such an assumption can be valid because the allocated bandwidth may not necessarily be utilized completely, even at the peak bit rate. Thus, by estimating the packet loss rate in this method, the packet loss rate is effectively given an upper bound, which in turn improves the safety of the call set up control. Moreover, more efficient utilization of the communication resource is achieved while improving the quality of service for the low speed call.

As for the method utilizing the peak bit rate and the average bit rate, it can be achieved similarly to that already explained above in conjunction with FIG. 18.

Figure 18:
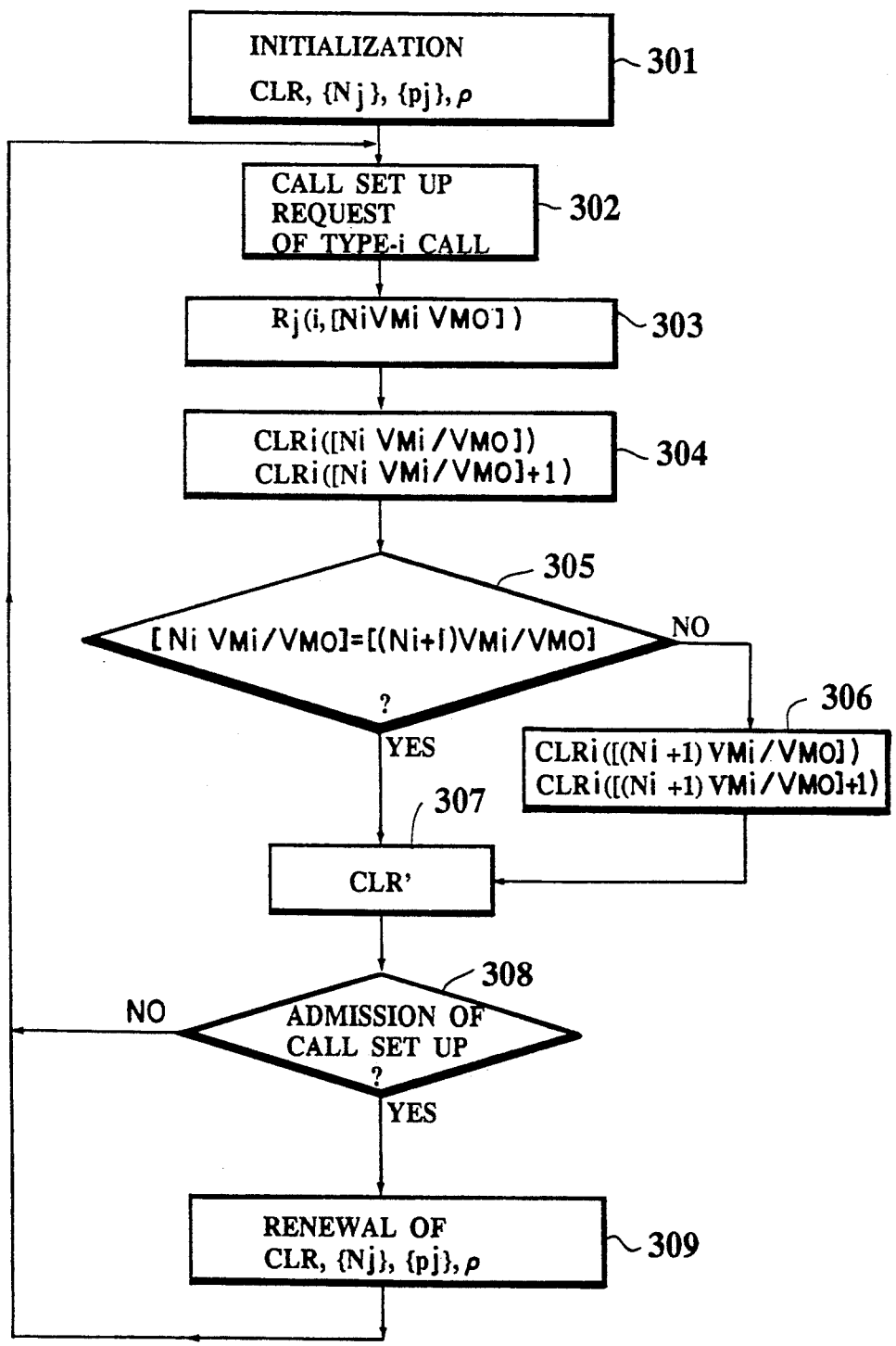
FIG. 18 is a flow chart for one method of estimating the packet loss rate in the calling set up control according to the flow chart of FIGS. 17, and 19 to 23.

It is to be noted that in both of the methods of FIG. 17 and FIG. 18 described above, the call set up request for the low speed call is granted an admission only when the required packet loss rate can be satisfied by the packet loss rate estimated by assuming that the request is granted an admission, so that the quality of service for the low speed call can also be maintained.

It is also to be noted that many modifications and variations of the above embodiments may be made without departing from the novel and advantageous features of the present invention. Accordingly, all such modifications and variations are intended to be included within the scope of the appended claims.

What is claimed is:

1. A method of call set up control in a packet network, comprising the steps of:

distinguishing a first type of calls for which a ratio of a maximum transfer speed of each call with respect to a transfer speed of a multiplexed line of the packet network is greater than a predetermined threshold value, and a second type of calls for which a ratio of the maximum transfer speed of each call with respect to the transfer speed of a multiplexed line of the packet network is not greater than the predetermined threshold value; and performing a priority control to favor the first type of calls over the second type of calls such that all packets of the first type of calls are transferred before any packet of the second type of calls.

2. The method of claim 1, wherein the priority control is performed by allocating a peak bit rate to the first type of calls when a sum of the maximum transfer speeds of the first type of calls is not greater than the transfer speed of the multiplexed line of the packet network.

3. The method of claim 1, wherein the performing step further comprises the steps of:

granting admission to a set up of a requesting call only when the requesting call belongs to the first type of calls, a sum of the maximum transfer speeds of the first type of calls already set up and that of the requesting call is not greater than the transfer speed of the multiplexed line of the packet network, and a packet loss rate for the second type of calls already set up can be maintained at a satisfactory level even when the requesting call is set up; and granting admission to a set up of a requesting call only when the requesting call belongs to the second type of calls, and a packet loss rate for the second type of calls already set up can be maintained at a satisfactory level even when the requesting call is set up.

4. The method of claim 3, wherein whether the packet loss rate for the second type of calls already set up can be maintained at a satisfactory level even when the requesting call is set up is determined, when the requesting call belongs to the first type of calls, employing the steps of:

assuming that a time T is taken for transferring one packet at the maximum transfer speed when the ratio of the maximum transfer speed of the requesting call with respect to the transfer speed of multiplexed line of the packet network is equal to the predetermined threshold value;

deriving a first probability $f_r(n)$ for n packets to be generated by the requesting call within the time T;

deriving a second probability f(n) for n packets to be generated by the first type of calls already set up plus the requesting call within the time T, from the first probability $f_r(n)$;

estimating the packet loss rate by assuming that (T-n) packets per time T of bandwidth can be used for the second type of calls at the second probability f(n); and comparing the estimated packet loss rate with a required packet loss rate required by the requesting call.

5. The method of claim 3, wherein whether the packet loss rate for the second type of calls already set up can be maintained at a satisfactory level even when the requesting call is set up is determined, when the requesting call belongs to the first type of calls, in the steps of:

expressing a traffic characteristic of each call by the maximum transfer speed of each call and an average transfer speed of each call;

estimating the packet loss rate by assuming that those packets arriving in excess of a prescribed number of packets transferrable within a given period of time are to be discarded; and comparing the estimated packet loss rate with a required packet loss rate required by the requesting call.

6. A call set up control device in a packet network, the call set up control device comprising:

means for distinguishing a first type of calls for which a ratio of a maximum transfer speed of each call with respect to a transfer speed of a multiplexed line of the packet network is greater than a predetermined threshold value, and a second type of calls for which a ratio of the maximum transfer speed of each call with respect to the transfer speed of a multiplexed line of the packet network is not greater than the predetermined threshold value; and means for performing a priority control to favor the first type of calls over the second type of calls such that all packets of the first type of calls are transferred before any packet of the second type of calls.

7. The device of claim 6, wherein performing means performs the priority control by allocating a peak bit rate to the first type of calls when a sum of the maximum transfer speeds of the first type of calls is not grater than the transfer speed of the multiplexed line of the packet network.

8. The device of claim 6, wherein the performing means further comprises:

first means for granting admission to a set up of a requesting call only when the requesting call belongs to the first type of calls, a sum of the maximum transfer speeds of the first type of calls already set up and that of the requesting call is not greater than the transfer speed of the multiplexed line of the packet network, and a packet loss rate for the second type of calls already set up can be maintained at a satisfactory level even when the requesting call is set up; and second means for granting admission to a set up of a requesting call only when the requesting call belongs to the second type of calls, and a packet loss rate for the second type of calls already set up can be maintained at a satisfactory level even when the requesting call is set up.

9. The device of claim 8, wherein whether the packet loss rate for the second type of calls already set up can be maintained at a satisfactory level even when the requesting call is set up is determined, when the requesting call belongs to the first type of calls, by:

assuming that a time T is taken for transferring one packet at the maximum transfer speed when the ratio of the maximum transfer speed of the requesting call with respect to the transfer speed of multiplexed line of the packet network is equal to the predetermined threshold value;

deriving a first probability $f_r(n)$ for n packets to be generated by the requesting call within the time T;

deriving a second probability $f(n)$ for n packets to be generated by the first type of calls already set up plus the requesting call within the time T, from the first probability $f_r(n)$;

estimating the packet loss rate by assuming that (T-n) packets per time T of bandwidth can be used for the second type of calls at the second probability $f(n)$; and comparing the estimated packet loss rate with a required packet loss rate required by the requesting call.

10. The device of claim 8, wherein whether the packet loss rate for the second type of calls already set up can be maintained at a satisfactory level even when the requesting call is set up is determined, when the requesting call belongs to the first type of calls, by:

expressing a traffic characteristic of each call by the maximum transfer speed of each call and an average transfer speed of each call;

estimating the packet loss rate by assuming that those packets arriving in excess of a prescribed number of packets transferrable within a given period of time are to be discarded; and comparing the estimated packet loss rate with a required packet loss rate required by the requesting call.

* * * * *